(12) United States Patent
Naito et al.

(10) Patent No.: US 9,160,453 B2
(45) Date of Patent: Oct. 13, 2015

(54) RING NETWORK SETUP METHOD

(71) Applicant: FUJITSU LIMITED, Kawasaki-shi (JP)

(72) Inventors: Kanji Naito, Kawasaki (JP); Takashi Honda, Kawasaki (JP); Hiroyuki Homma, Kawasaki (JP); Toru Katagiri, Kawasaki (JP); Ryoichi Mutoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 13/850,494

(22) Filed: Mar. 26, 2013

(65) Prior Publication Data

US 2013/0216227 A1 Aug. 22, 2013

Related U.S. Application Data

(63) Continuation of application No. PCT/JP2010/067009, filed on Sep. 29, 2010.

(51) Int. Cl.
*H04B 10/00* (2013.01)
*H04B 10/275* (2013.01)
*H04L 12/42* (2006.01)
*H04L 12/437* (2006.01)

(52) U.S. Cl.
CPC .............. *H04B 10/275* (2013.01); *H04L 12/42* (2013.01); *H04L 12/437* (2013.01)

(58) Field of Classification Search
USPC ...................................................... 398/58–59
See application file for complete search history.

(56) References Cited

U.S. PATENT DOCUMENTS

| 5,289,302 | A | * | 2/1994 | Eda .................................. 398/51 |
| 5,365,344 | A | * | 11/1994 | Eda et al. ......................... 398/79 |
| 5,465,254 | A | * | 11/1995 | Wilson et al. ................. 370/466 |
| 5,537,393 | A | * | 7/1996 | Shioda et al. ................. 370/223 |
| 5,796,501 | A | * | 8/1998 | Sotom et al. ..................... 398/59 |
| 5,854,699 | A | * | 12/1998 | Olshansky ....................... 398/79 |
| 6,895,182 | B1 | * | 5/2005 | Moriyama et al. ................ 398/3 |
| 7,447,429 | B2 | * | 11/2008 | Yamaguchi et al. .............. 398/4 |

(Continued)

FOREIGN PATENT DOCUMENTS

JP 11220482 A 8/1999
JP 2001-326664 11/2001

(Continued)

OTHER PUBLICATIONS

Notification of Transmittal of Translation of The International Preliminary Report on Patentability (Form PCT/IB/338, Form PCT/IB/373 & Form PCT/ISA/237), International Application No. PCT/JP2010/067009, 6 pages, dated Apr. 25, 2013.

(Continued)

*Primary Examiner* — Agustin Bello
(74) *Attorney, Agent, or Firm* — Fujitsu Patent Center

(57) ABSTRACT

A network setup method used in a ring network including a plurality of transmission equipments. The method includes: transmitting a frame in the ring network; causing each of the transmission equipments to write an identifier to the frame according to a specified rule; determining whether or not a plurality of identifiers written to the frame by the plurality of transmission equipments satisfy a specified condition; and causing each of the transmission equipments to obtain a corresponding identifier according to the specified rule from among the plurality of identifiers, when the plurality of identifiers satisfy the specified condition.

10 Claims, 29 Drawing Sheets

(56) References Cited

U.S. PATENT DOCUMENTS

| | | | |
|---|---|---|---|
| 7,733,810 B2 * | 6/2010 | Denecheau et al. | 370/258 |
| 8,744,262 B2 * | 6/2014 | Barnard | 398/49 |
| 8,767,533 B2 * | 7/2014 | Lu | 370/229 |
| 2001/0019540 A1 | 9/2001 | Uematsu et al. | |
| 2002/0009091 A1 * | 1/2002 | Taniguchi | 370/403 |
| 2002/0067700 A1 * | 6/2002 | Shimadoi et al. | 370/258 |
| 2005/0207755 A1 * | 9/2005 | Rabbat et al. | 398/59 |
| 2008/0124081 A1 * | 5/2008 | Hamada et al. | 398/59 |
| 2012/0141118 A1 * | 6/2012 | Ohba et al. | 398/9 |
| 2013/0216227 A1 * | 8/2013 | Naito et al. | 398/59 |

FOREIGN PATENT DOCUMENTS

| | | |
|---|---|---|
| JP | 2004-214826 | 7/2004 |
| JP | 2006-129530 | 5/2006 |

OTHER PUBLICATIONS

International Search Report, mailed in connection with PCT/JP2010/067009 and mailed Nov. 2, 2010.

Japanese Office Action mailed May 14, 2013 for corresponding Japanese Application No. 2012-536069, with English-language Translation.

* cited by examiner

| Frame (F6F6) | Cmd | Version | length | unique0 | unique1 | unique2 | unique3 | unique4 | unique5 |
|---|---|---|---|---|---|---|---|---|---|
| 2B | 1B | 1B | 2B | 1B | 1B | 1B | 1B | 1B | 1B |

| Eslot | MyNode ID | Near-Node1 | Near-Node2 | ... | Near-Node253 | CRC |
|---|---|---|---|---|---|---|
| 1B | 1B | 1B | 1B | | 1B | 2B |

FIG. 13

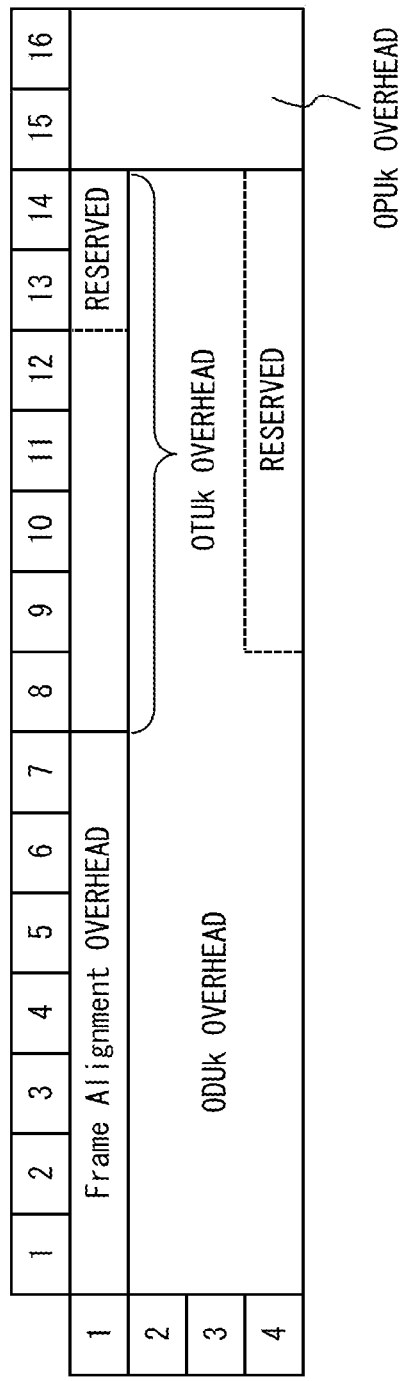
F I G. 14

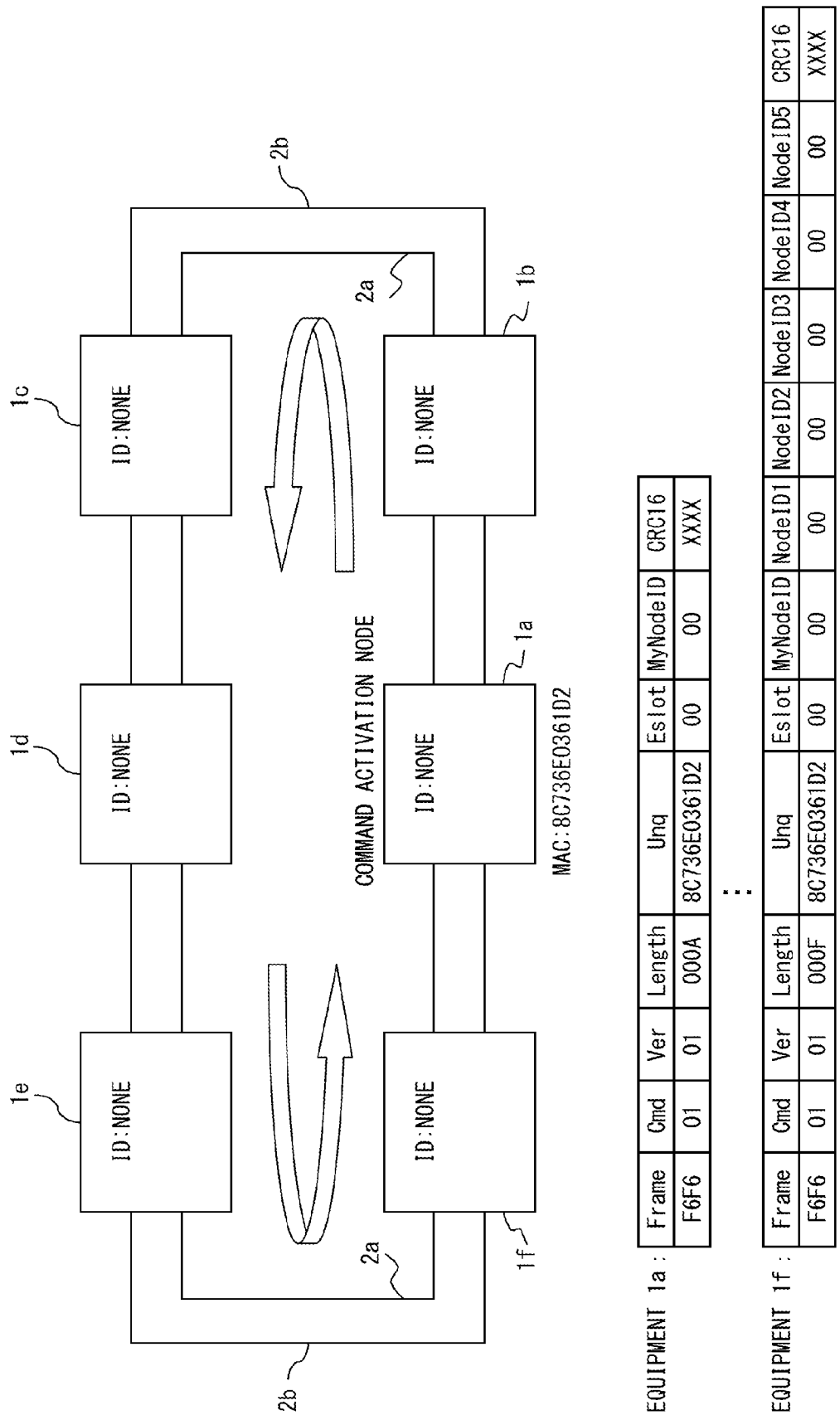
F I G. 21

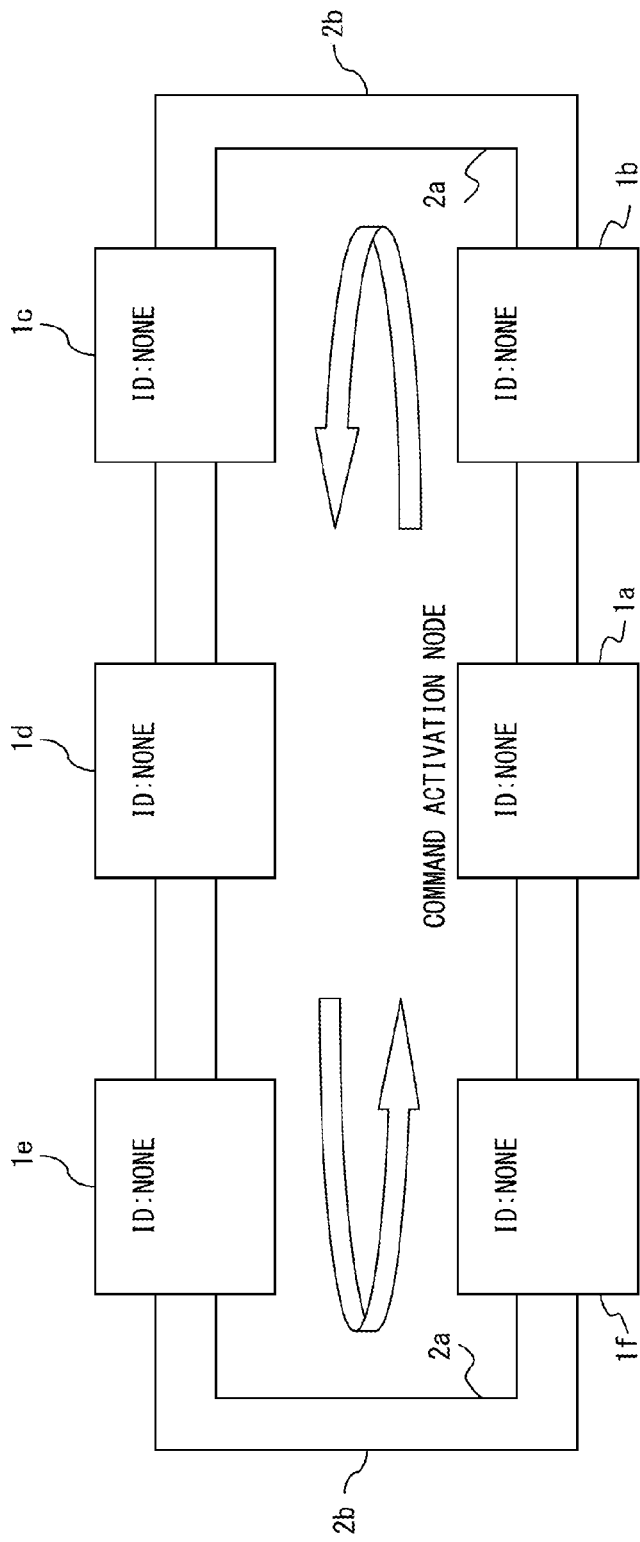
F I G. 22

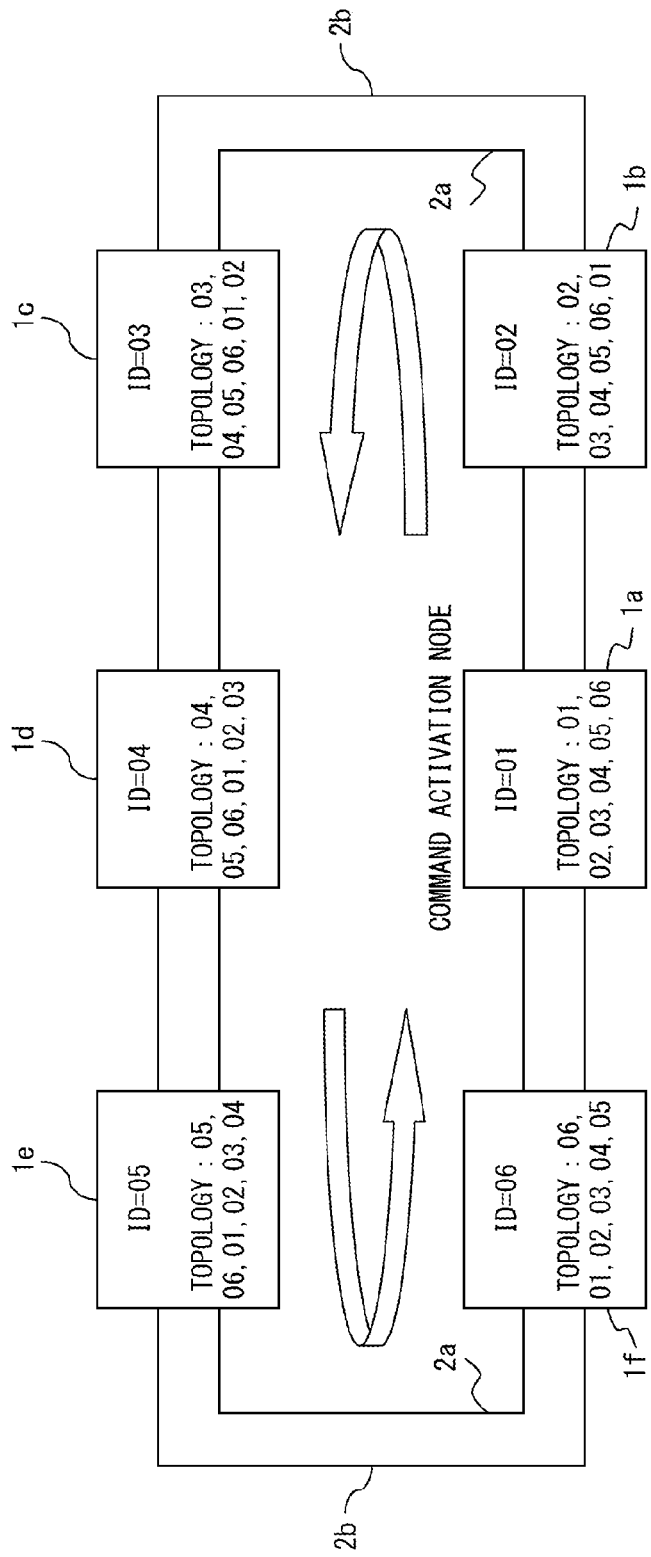
F I G. 23

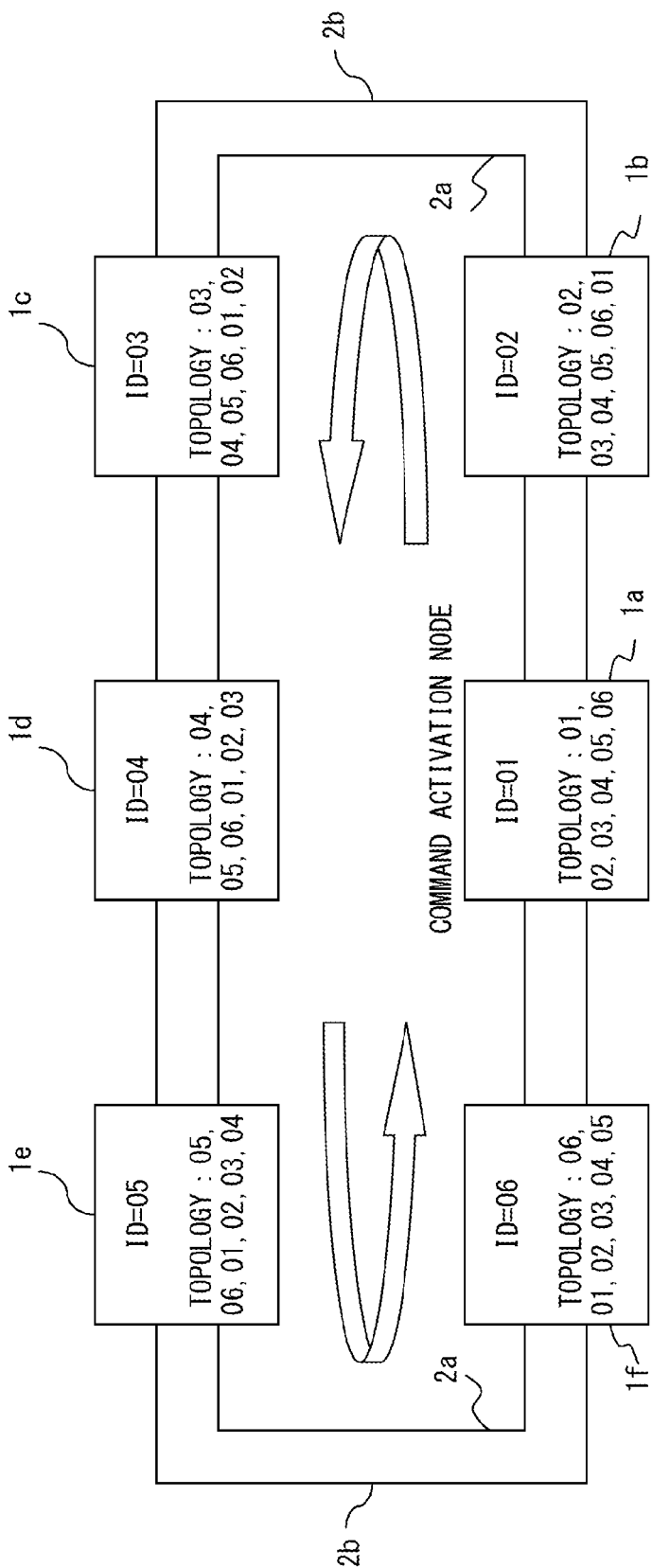
F I G. 24

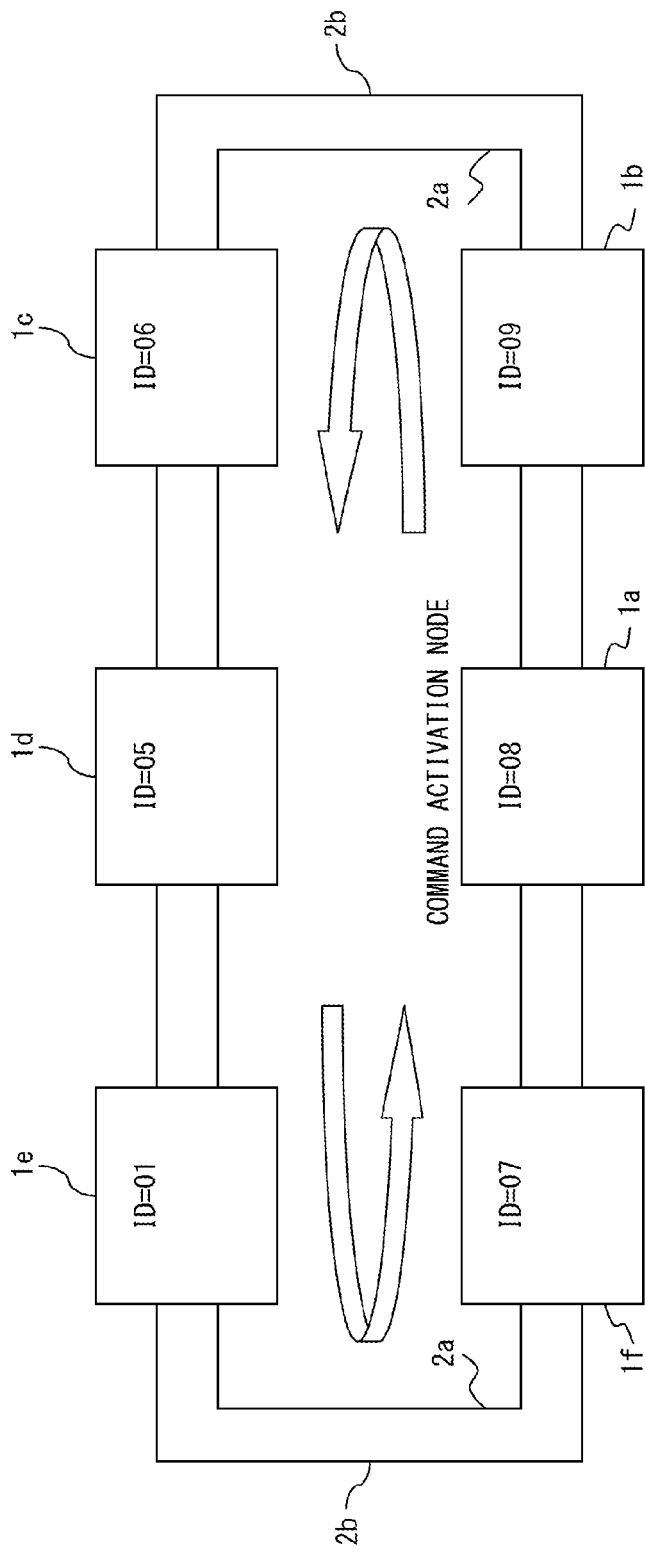
F I G. 25

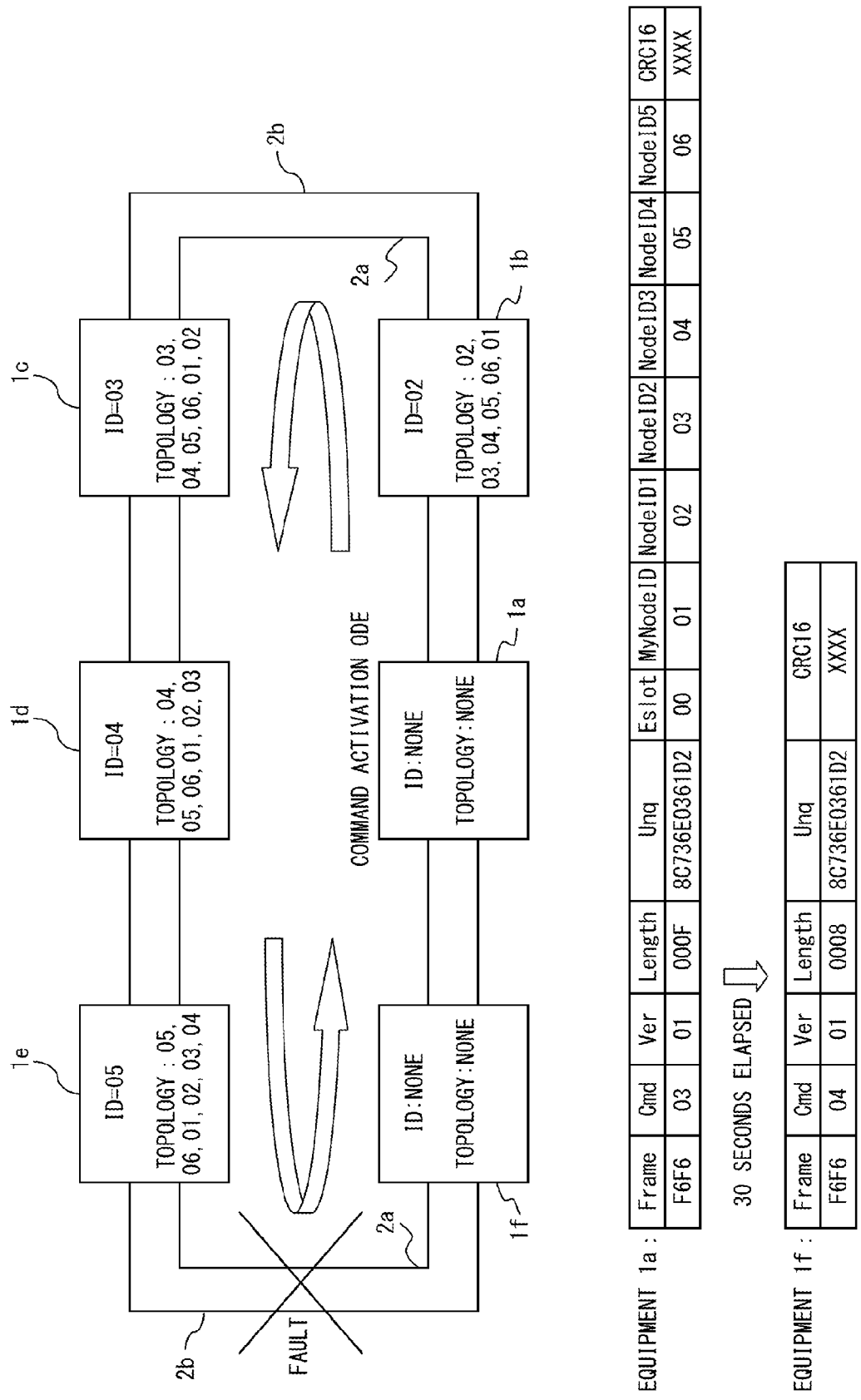
F I G. 27

RING NETWORK SETUP METHOD

CROSS-REFERENCE TO RELATED APPLICATION

This application is a continuation application of International Application PCT/JP2010/067009 filed on Sep. 29, 2010 and designated the U.S., the entire contents of which are incorporated herein by reference.

FIELD

The embodiments discussed herein are related to a method of setting up a ring network and transmission equipment on the ring network.

BACKGROUND

As one of techniques for implementing ring protection of an optical transmission system, BLSR (Bi-directional Line Switched Ring) has been put into practical use. In a transmission system employing the BLSR, a plurality of nodes are connected by a pair of transmission lines in the form of a ring. The pair of transmission lines is configured to transmit a signal respectively in reverse directions. At normal operations, however, a data signal is transmitted via either of the pair of transmission lines. Namely, one of the pair of transmission lines is used as an active system, whereas the other is used as a standby system.

When a fault occurs in a transmission system employing the BLSR, node equipment autonomously switches a transmission route of a data signal so that a path for bypassing the fault is formed. As a result, the transmission system transmits the data signal by using not only a transmission line of an active system but that of a standby system.

In the BLSR, each of node equipments recognizes a network topology, which is connection information of the node equipments, in order to autonomously switch a transmission route when a fault occurs. The topology information that represents a network topology is generated, for example, by using node IDs uniquely assigned to node equipments. In the BLSR, a function of detecting a fault and automatically recovering a path is sometimes referred to as APS (Automatic Protection Switching).

As a related technique, a ring network setup method for automatically setting up a topology in a ring network where a plurality of transmission equipments are connected by transmission lines in the form of a ring is proposed. This method includes a procedure of setting, in all transmission equipments, one or a plurality of bytes for transferring topology information within an overhead of a transmission frame, a direction where the topology information is transferred by the bytes, and a topology setup completion decision condition, and a procedure of sequentially transmitting the topology information by the set bytes in the set transfer direction from designated transmission equipment, and of determining whether or not a topology setup has been complete according to the topology setup completion decision condition (for example, Japanese Laid-open Patent Publication No. 2004-214826).

As another related technique, optical transmission equipment used in a ring transmission system where a time-division multiplexed optical signal can be bidirectionally transmitted is proposed. This optical transmission equipment includes connection form recognition means, connected to a bidirectional ring transmission line, for recognizing a connection form between a transmission ring and another transmission ring connected to the transmission ring, fault section detection means, connected to the connection form recognition means, for detecting a section where a fault has occurred, and loop-back switching control means, connected to the connection form recognition means and the fault section detection means, for switching a transmission route based on the connection form and the section (for example, Japanese Laid-open Patent Publication No. 2006-129530).

In BLSR used in SONET/SDH (Synchronous Optical NETwork/Synchronous Digital Hierarchy), a maximum of 16 nodes can be arranged in one ring network. In recent years, however, the demand for arranging a lot more nodes in one ring network has been increasing. Accordingly, for example, recent OTN (Optical Transport Network) architectures recommend that a maximum of 128 or 256 nodes can be arranged in one ring network.

Incidentally, different node IDs are assigned to nodes in order to implement BLSR. However, when the number of nodes arranged in one ring network increases, it becomes difficult to assign different node IDs to the nodes, and to manage the node IDs.

For example, when node equipment is newly added to a ring network, an operator who sets up or manages the network initially verifies node IDs of node equipments on the ring network. The operator searches for and obtains an unused node ID. Then, the operator assigns the obtained node ID to the new node equipment. Accordingly, if the number of nodes arranged in one ring network grows, the length of time needed to assign and manage node IDs increases. Additionally, setting mistakes such as a mistake of redundantly assigning the same node ID to a plurality of node equipments are more prone to occur.

This problem occurs not only in a transmission system employing BLSR. Namely, the above described problem may occur in a ring network where a plurality of transmission equipments are connected by transmission lines in the form of a ring.

SUMMARY

According to an aspect of the embodiments, a network setup method is used in a ring network including a plurality of transmission equipments. The network setup method includes: transmitting a frame in the ring network; causing each of the transmission equipments to write an identifier to the frame according to a specified rule; determining whether or not a plurality of identifiers written to the frame by the plurality of transmission equipments satisfy a specified condition; and causing each of the transmission equipments to obtain a corresponding identifier according to the specified rule from among the plurality of identifiers, when the plurality of identifiers satisfy the specified condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates an example of a topology setup frame.

FIG. 14 illustrates a format of an OTU/ODU/OPU overhead.

FIGS. 21 to 24 illustrate a first example of the network setup method.

FIG. 25 illustrates a second example of the network setup method.

FIG. 27 illustrates a fourth example of the network setup method.

DESCRIPTION OF EMBODIMENTS

Figure 1:
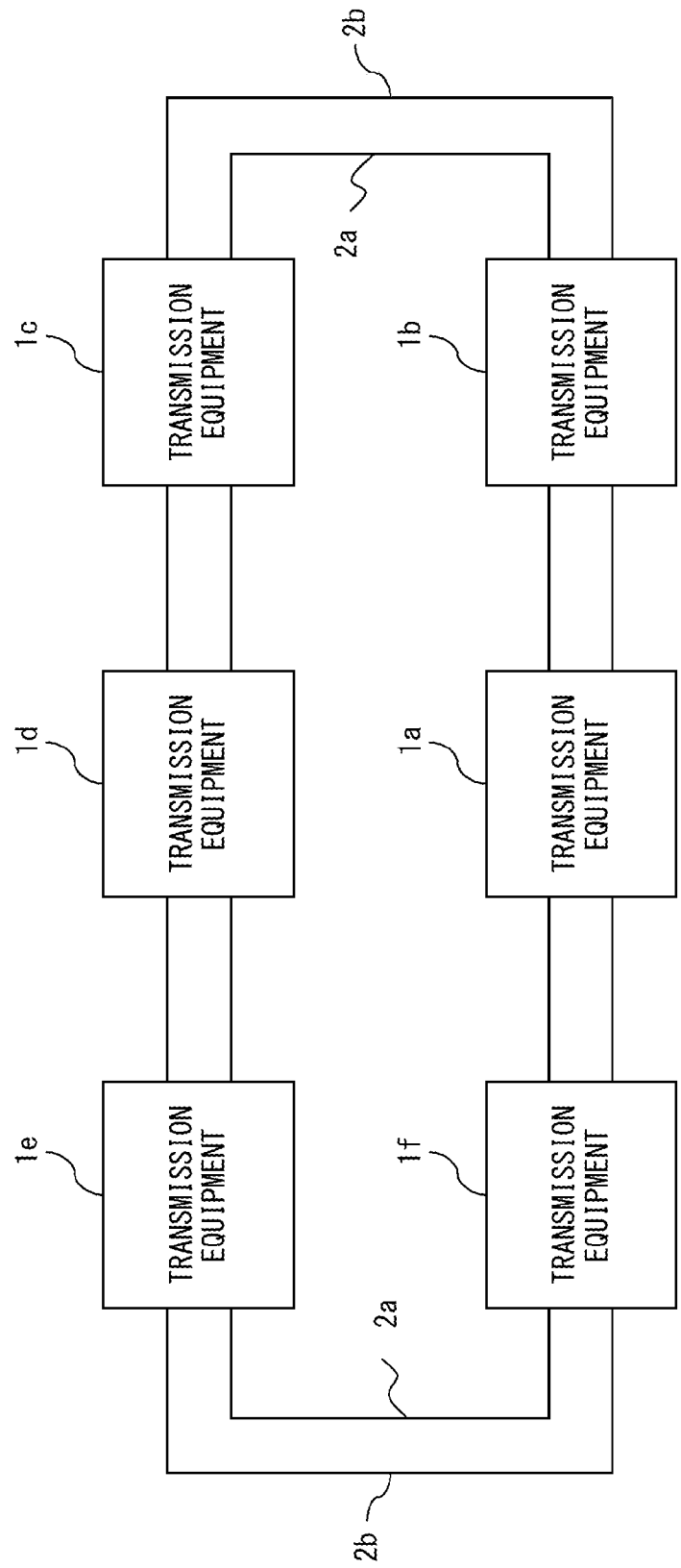
FIG. 1 illustrates an example of a network using a network setup method according to an embodiment.

FIG. 1 illustrates an example of a network using a network setup method according to an embodiment. The network illustrated in FIG. 1 includes a plurality of transmission equipments 1a to 1f. The transmission equipments 1a to 1f are connected by a pair of transmission lines 2a and 2b in the form of a ring. In this example, the ring network illustrated in FIG. 1 provides BLSR (Bi-directional Line Switched Ring) in order to implement ring protection.

Each of the transmission equipments (node equipments) 1a to 1f is optical transmission equipment that transmits an optical signal via the transmission lines 2a and 2b. Each of the transmission equipments 1a to 1f may be WDM transmission equipment that transmits a WDM optical signal. In this case, each of the transmission equipments 1a to 1f may include an OADM (Optical Add Drop Multiplexer).

The transmission lines 2a and 2b are optical fiber transmission lines for respectively propagating an optical signal. The transmission lines 2a and 2b propagate an optical signal respectively in reverse directions. In this example, the transmission line 2a propagates an optical signal counterclockwise, whereas the transmission line 2b propagates an optical signal clockwise. At normal operations, however, an optical signal is transmitted via either of the transmission lines 2a, 2b.

In the following description, a point where each of the transmission equipments 1a to 1f is arranged is referred to as a "node". Here, to implement BLSR, an identifier is assigned to each of the transmission equipments 1a to 1f. Accordingly, the identifier assigned to each of the transmission equipments 1a to 1f is referred to as a "node ID" (or simply as an "ID") in the following description. Moreover, each of the transmission equipments 1a to 1f has topology information that represents a topology of the network in order to implement BLSR.

The network setup method according to the embodiment includes a procedure of assigning a node ID to each of the transmission equipments 1a to 1f (or a procedure with which each of the transmission equipments 1a to 1f obtains a node ID) in the above described network. The network setup method according to the embodiment also includes a procedure of setting topology information for each of the transmission equipments 1a to 1f (or a procedure with which each of the transmission equipments 1a to 1f obtains topology information).

The network illustrated in FIG. 1 includes one pair of transmission lines 2a, 2b in order to offer BLSR. However, the network may include two or more pairs of transmission lines. Additionally, the network using the network setup method according to the embodiment does not need to be a BLSR system. Namely, the network setup method according to the embodiment can be used in a ring network where a plurality of transmission equipments are connected by transmission lines in the form of a ring.

Figure 2:
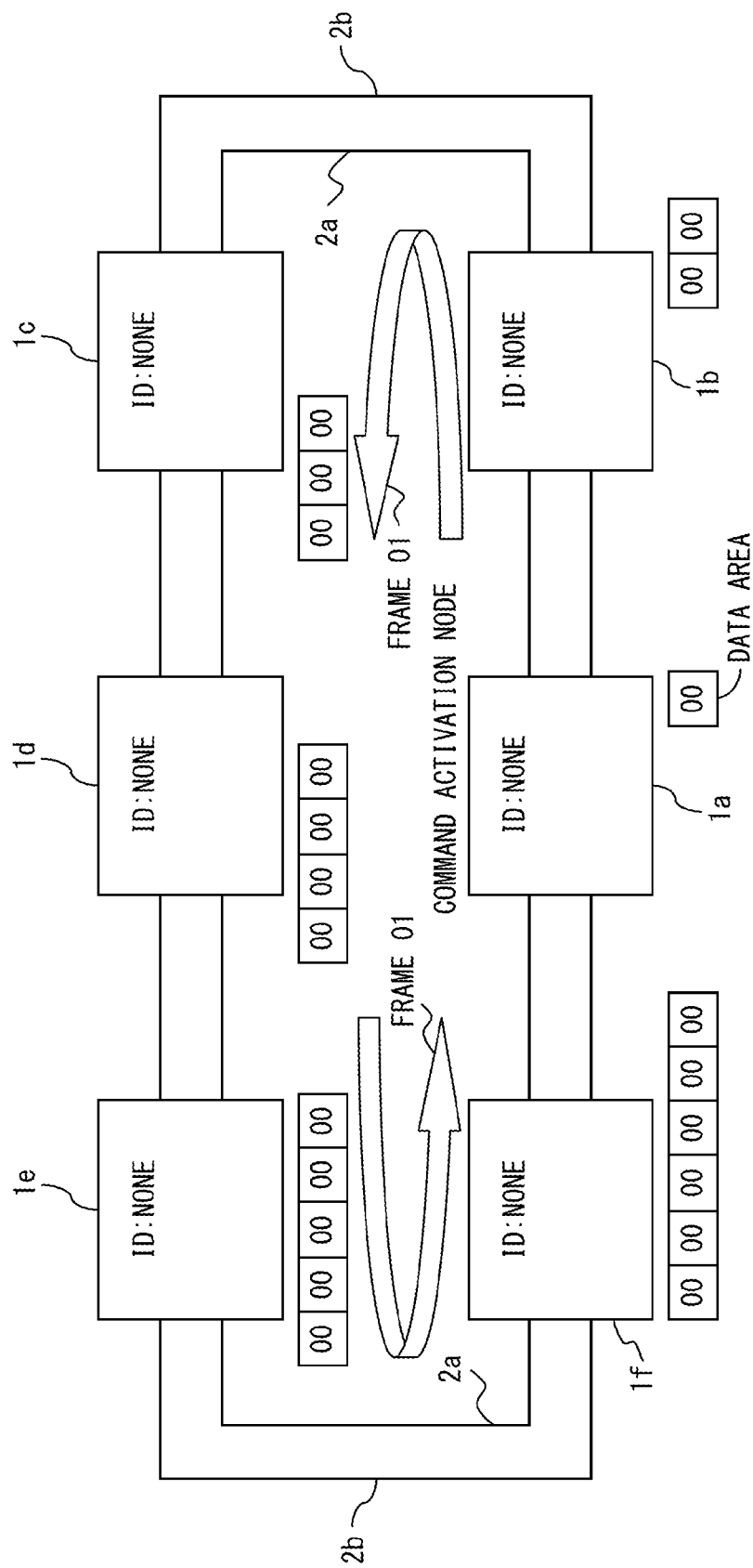
FIGS. 2 to 4 are explanatory diagrams of the network setup method according to the embodiment.
Figure 3:
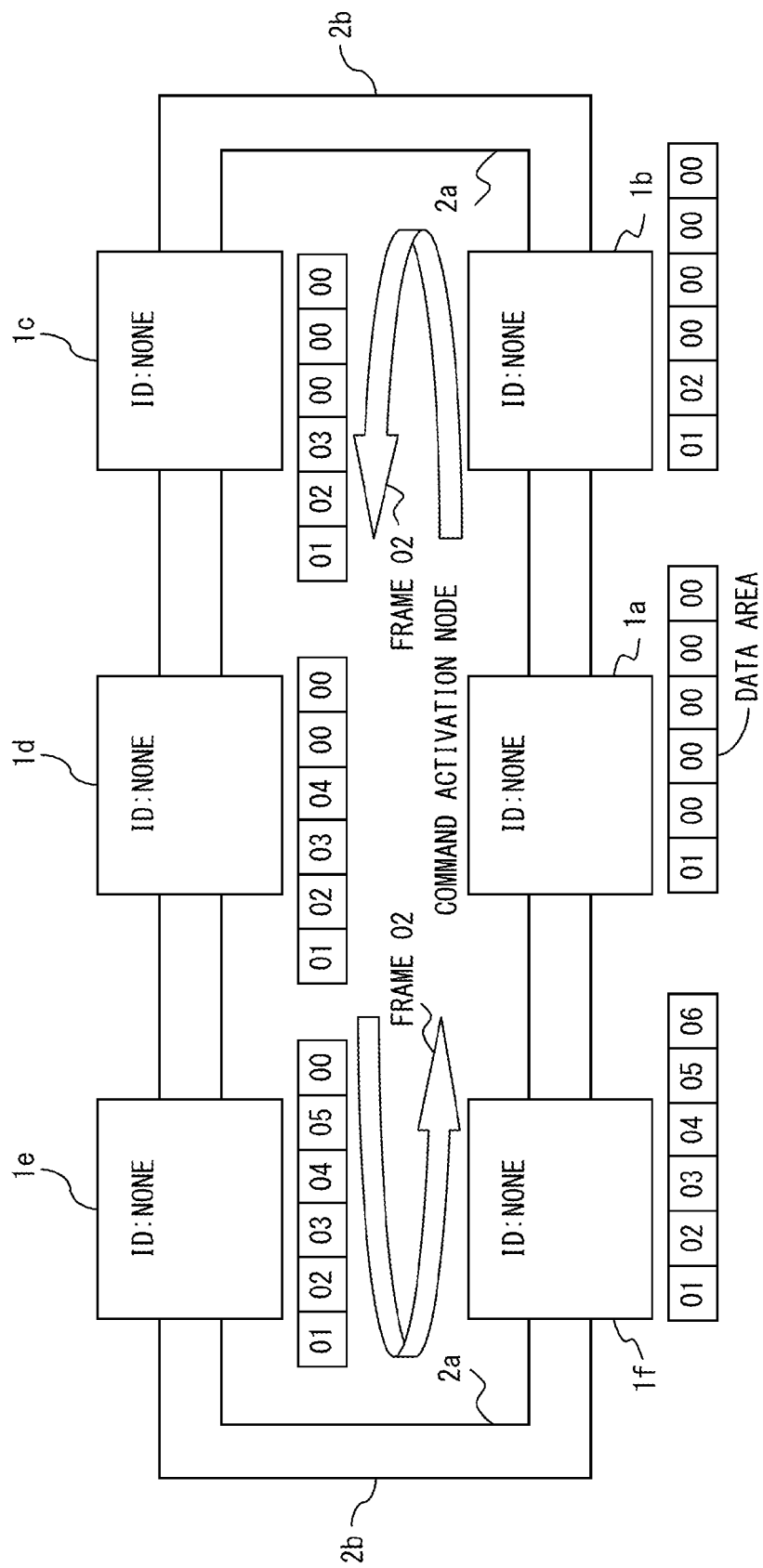
Figure 4:
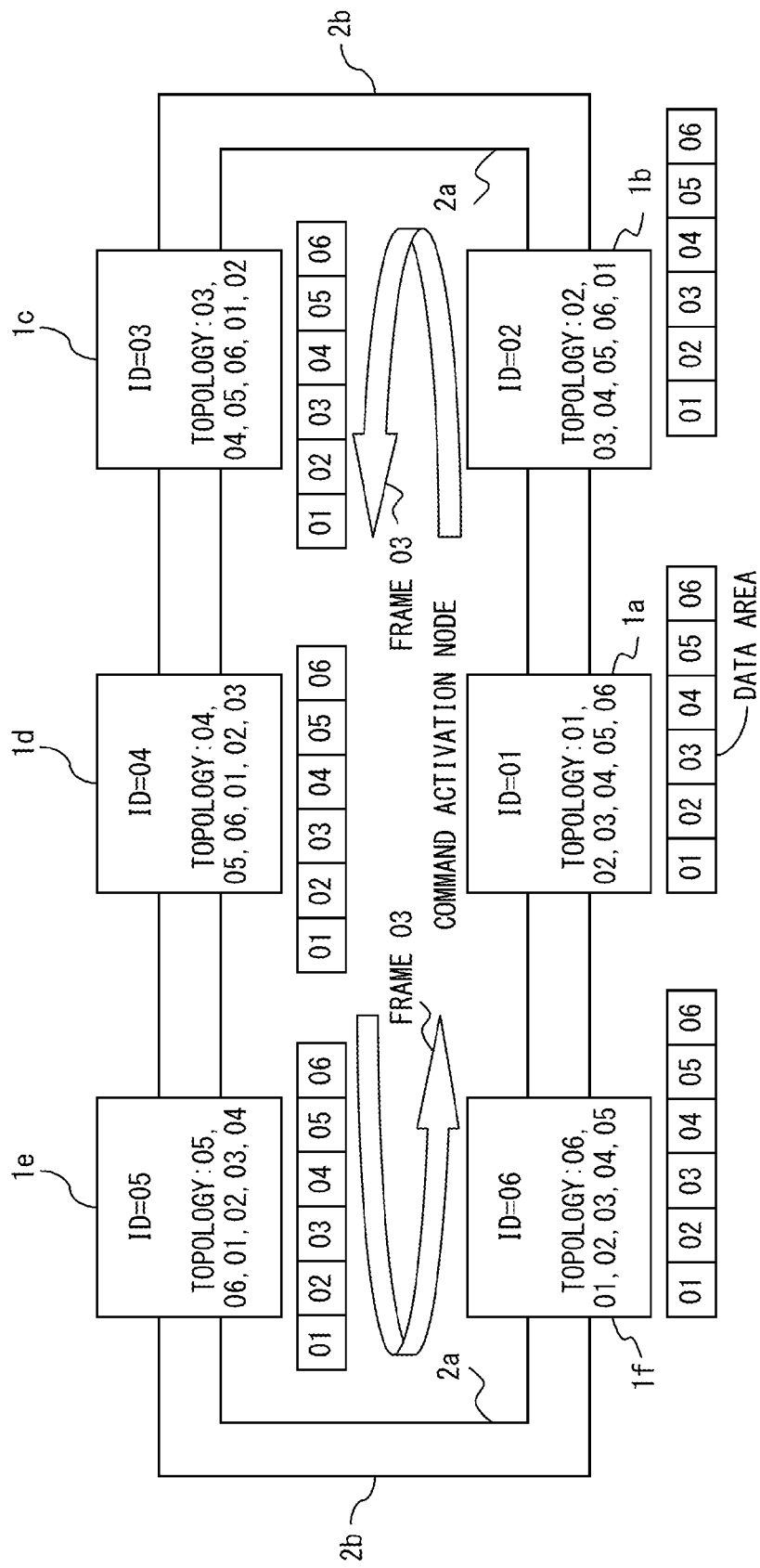

FIGS. 2 to 4 are explanatory diagrams of the network setup method according to the embodiment. The following description assumes that node IDs have not been assigned yet to the transmission equipments 1a to 1f when the network setup method is started.

With the network setup method according to the embodiment, an operator who sets up or manages a network selects transmission equipment for generating and transmitting a topology setup frame from among the transmission equipments 1a to 1f. In the following description, the transmission equipment for generating and transmitting a topology setup frame is sometimes referred to as "particular transmission equipment". This embodiment assumes that the transmission equipment 1a operates as the particular transmission equipment. Moreover, a topology setup frame includes a command used in procedures of setting up a network as will be described later. Namely, the particular transmission equipment is responsible for activating a command. Accordingly, the particular transmission equipment is sometimes referred to as a "command activation node".

The network setup method according to the embodiment includes a procedure of detecting the number of nodes on a network, a procedure of assigning a temporary node ID to each transmission equipment, and a procedure of setting a node ID and topology information in each transmission equipment. These three procedures are sequentially described below.

(1) Detecting the Number of Nodes (FIG. 2)

The transmission equipment 1a generates a topology setup frame. The topology setup frame includes a command Cmd01 for detecting the number of nodes. Accordingly, a frame including the command Cmd01 is referred to as a "topology setup frame 01". Then, the transmission equipment 1a writes presence information representing that local equipment (namely, the transmission equipment 1a) is present to a data area of the topology setup frame 01. In this example, the presence information is "00". The transmission equipment 1a transmits the topology setup frame 01 to the transmission equipment 1b so that the topology setup frame 01 goes round the ring network.

Upon receipt of the topology setup frame 01 from the transmission equipment 1a, the transmission equipment 1b writes presence information representing that the local equipment (namely, the transmission equipment 1b) is present to the data area of the topology setup frame 01. At this time, the transmission equipment 1b adds the presence information of the local equipment (namely, the transmission equipment 1b) next to the presence information written by the immediately preceding transmission equipment (namely, the transmission equipment 1a). Then, the transmission equipment 1b transmits the topology setup frame 01 to the transmission equipment 1c. Accordingly, two "00"s are written in the data area of the topology setup frame transmitted from the transmission equipment 1b to the transmission equipment 1c.

Upon receipt of the topology setup frame 01 from the transmission equipment 1b, the transmission equipment 1c writes presence information representing that the local equipment (namely, the transmission equipment 1c) is present to the data area of the topology setup frame 01. At this time, the transmission equipment 1c adds the presence information of the local equipment (namely, the transmission equipment 1c) next to the presence information written by the immediately preceding transmission equipment (namely, the transmission equipment 1b). Then, the transmission equipment 1c transmits the topology setup frame 01 to the transmission equipment 1d. Accordingly, three "00"s are written in the data area of the topology setup frame transmitted from the transmission equipment 1c to the transmission equipment 1d.

Operations of the transmission equipments 1d to 1f upon receipt of the topology setup frame 01 are substantially identical to those of the transmission equipments 1b and 1c.

Accordingly, six "00"s are written in the data area of the topology setup frame 01 transmitted from the transmission equipment 1f to the transmission equipment 1a.

Upon receipt of the topology setup frame 01 from the transmission equipment 1f, the transmission equipment 1a, which is the particular transmission equipment, detects the number of transmission equipments (namely, the number of nodes) arranged on the ring network based on contents of the data area of the topology setup frame 01. In this example, the six "00"s are written in the data area of the topology setup frame 01.

Accordingly, the transmission equipment 1a determines that the number of nodes (namely, the number of transmission equipments) on the ring network is "6".

(2) Assigning a Temporary Node ID (FIG. 3)

The transmission equipment 1a generates a topology setup frame 02 by updating the command identifier Cmd included in the topology setup frame 01 from "01" to "02". Accordingly, the six "00"s are written in the data area of the topology setup frame 02 at this time point. The command Cmd02 instructs each of the transmission equipments to write an ID to the data area of the topology setup frame 02. Namely, each of the transmission equipments writes an ID of the transmission equipment to the data area upon receipt of the topology setup frame 02 including the command Cmd02. Accordingly, data written to a data area of a topology setup frame 02 is sometimes referred to as "node ID data" in the following description.

The transmission equipment 1a generates a temporary node ID. Here, the transmission equipment 1a is the particular transmission equipment. Accordingly, the transmission equipment 1a can use an arbitrary value as the temporary node ID. In this example, the transmission equipment 1a generates a temporary node ID "01". Then, the transmission equipment 1a rewrites the presence information that the transmission equipment 1a previously wrote to the data area to the temporary node ID generated by the transmission equipment 1a. Namely, the node ID data within the data area is updated from "00,00,00,00,00,00" to "01,00,00,00,00,00". Then, the transmission equipment 1a transmits the topology setup frame 02 to the transmission equipment 1b so that the topology setup frame 02 goes round the ring network.

Upon receipt of the topology setup frame 02 from the transmission equipment 1a, the transmission equipment 1b generates a temporary node ID. At this time, the transmission equipment 1b generates a value other than the temporary node ID already written to the data area of the topology setup frame 02. Namely, the transmission equipment 1b generates a value other than "01" as a temporary node ID. In this example, the transmission equipment 1b generates a temporary node ID "02".

Then, the transmission equipment 1b rewrites the presence information that the transmission equipment 1b previously wrote to the data area to the temporary node ID generated by the transmission equipment 1b. Namely, the node ID data is updated from "01,00,00,00,00,00" to "01,02,00,00,00,00". Then, the transmission equipment 1b transmits the topology setup frame 02 to the transmission equipment 1c.

Upon receipt of the topology setup frame 02 from the transmission equipment 1b, the transmission equipment 1c generates a value other than the temporary node IDs already written to the data area. Namely, the transmission equipment 1c generates a value other than "01" and "02" as a temporary node ID. In this example, the transmission equipment 1c generates a temporary node ID "03". Moreover, the transmission equipment 1c updates the data area similarly to the transmission equipment 1b. Accordingly, the node ID data is updated from "01,02,00,00,00,00" to "01,02,03,00,00,00". Then, the transmission equipment 1c transmits the topology setup frame 02 to the transmission equipment 1d.

Operations of the transmission equipments 1d to 1f upon receipt of the topology setup frame 02 are substantially identical to those of the transmission equipments 1b and 1c. However, the transmission equipments 1d, 1e, and 1f generate temporary node IDs "04", "05", and "06", respectively. Accordingly, the node ID data of the topology setup frame 02 transmitted from the transmission equipment 1f to the transmission equipment 1a is updated to "01,02,03,04,05,06" as illustrated in FIG. 3.

Upon receipt of the topology setup frame 02 from the transmission equipment 1f, the transmission equipment 1a determines whether or not the temporary node IDs generated by the transmission equipments 1a to 1f satisfy a specified condition based on the node ID data stored in the data area. In this example, the transmission equipment 1a determines at least whether or not the temporary node IDs generated by the transmission equipments 1a to 1f are different from each other. When the temporary node IDs generated by the transmission equipments 1a to 1f are different from each other, the transmission equipment 1a starts a procedure of setting a node ID and topology information. The transmission equipment 1a may determine whether or not the temporary node IDs generated by the transmission equipments 1a to 1f satisfy another condition. For example, the transmission equipment 1a may verify that the node ID data does not include "00". If the node ID data includes "00", the transmission equipment 1a determines that transmission equipment that has not written a temporary node ID yet to the topology setup frame 02 is present, and issues an alarm.

(3) Setting a Node ID and Topology Information (FIG. 4)

The transmission equipment 1a generates a topology setup frame 03 by updating the command identifier Cmd set in the topology setup frame 02 from "02" to "03". At this time point, the node ID data of the topology setup frame 03 is "01,02,03, 04,05,06". The command Cmd03 instructs each of the transmission equipments to obtain a corresponding ID from among the plurality of IDs within the data area of the topology setup frame 03. Moreover, in this example, the command Cmd03 also instructs each of the transmission equipments to obtain topology information based on the plurality of IDs within the data area of the topology setup frame 03.

The transmission equipment 1a obtains a node ID and topology information based on the node ID data stored in the data area of the topology setup frame 03. Specifically, the transmission equipment 1a obtains the temporary node ID that the transmission equipment 1a previously wrote to the data area as a qualified node ID of the transmission equipment 1a. In this example, the transmission equipment 1a wrote the temporary node ID to a first sub-area of the data area. Accordingly, the transmission equipment 1a obtains the first value "01" of the node ID data "01,02,03,04,05,06" as the qualified node ID of the transmission equipment 1a.

Additionally, the transmission equipment 1a obtains the topology information based on the node ID data of the topology setup frame 03. Here, the transmission equipment 1a is the particular transmission equipment. Accordingly, the node ID data is the topology information for the transmission equipment 1a. Namely, the transmission equipment 1a obtains the topology information "01,02,03,04,05,06". This topology information represents that the transmission equipments identified with "02", "03", "04", "05", and "06" are sequentially arranged in a transmission direction of a signal in the active system ring. The transmission equipment 1a transmits the topology setup frame 03 to the transmission equipment 1b so that the topology setup frame 03 goes round the ring network.

Upon receipt of the topology setup frame 03 from the transmission equipment 1a, the transmission equipment 1b obtains a node ID and topology information. Specifically, the transmission equipment 1b obtains the temporary node ID that the transmission equipment 1b previously wrote to the data area as a qualified node ID of the transmission equipment 1b. Here, the transmission equipment 1b wrote the temporary node ID to the second sub-area of the data area. Accordingly, the transmission equipment 1b obtains the second value "02" of the node ID data "01,02,03,04,05,06" as the qualified node ID.

Furthermore, the transmission equipment 1b obtains the topology information based on the contents of the data area of the topology setup frame 03. Here, the transmission equipment 1b wrote the temporary node ID to the second sub-area of the data area as described above. Accordingly, the transmission equipment 1b cyclically shifts the elements of the node ID data so that the second value of the data area moves to the start. Then, the transmission equipment 1b obtains a result of this shift process as the topology information. Namely, the transmission equipment 1b obtains the topology information "02,03,04,05,06,01". This topology information represents that the transmission equipments identified with "03", "04", "05", "06", and "01" are sequentially arranged in the transmission direction of the signal in the active system ring. Then, the transmission equipment 1b transmits the topology setup frame 03 to the transmission equipment 1c.

Operations of the transmission equipments 1c to 1f upon receipt of the topology setup frame 03 are substantially identical to those of the transmission equipment 1b. Accordingly, the transmission equipment 1c obtains anode ID "03" and topology information "03,04,05,06,01,02". The transmission equipment 1d obtains a node ID "04", and topology information "04,05,06,01,02,03". The transmission equipment 2e obtains a node ID "05", and topology information "05, 06, 01, 02, 03, 04". The transmission equipment 1f obtains a node ID "06", and topology information "06,01,02,03,04,05".

As described above, with the network setup method according to the embodiment, each of the transmission equipments generates an ID (a temporary node ID in the example illustrated in FIGS. 2 to 4). Node IDs generated by the transmission equipments are notified to particular transmission equipment by using a frame (a topology setup frame in the embodiment) that goes round a ring network. The particular transmission equipment verifies whether or not the IDs generated by the transmission equipments are different from each other. When the IDs are different from each other, each of the transmission equipments obtains an ID generated by the local equipment as a qualified node ID. Namely, the network system including a plurality of transmission equipments autonomously generates different node IDs, and assigns the generated node IDs to the plurality of transmission equipments. Accordingly, an operator who sets up or manages the network does not need to decide the node IDs of the transmission equipments, and different node IDs can easily be assigned to the transmission equipments even if the number of nodes increases. Moreover, with the network setup method according to the embodiment, each of the transmission equipments can obtain topology information along with a node ID.

Figure 5:
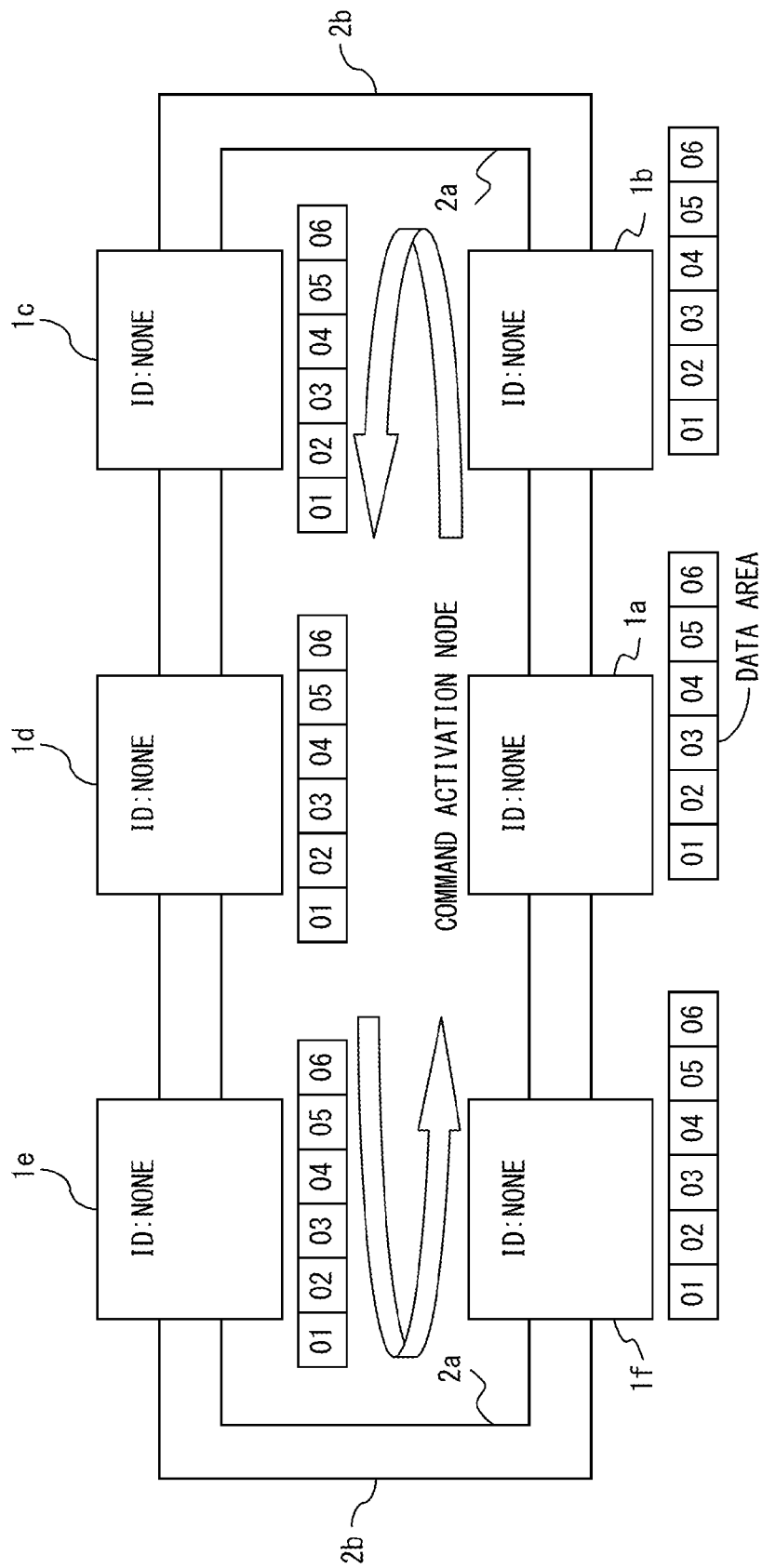
FIG. 5 is an explanatory diagram of a method by which particular transmission equipment decides node IDs.

FIG. 5 is an explanatory diagram of a method by which particular transmission equipment decides node IDs of all transmission equipments. Procedures illustrated in FIG. 5 are executed subsequently to the node number detection process described above with reference to FIG. 2. Here, assume that the transmission equipment 1a, operated as the particular transmission equipment, has received the topology setup frame 01 illustrated in FIG. 2 from the transmission equipment 1f. Contents of the data area of the topology setup frame 01 received by the transmission equipment 1a are "00,00,00, 00,00,00".

The transmission equipment 1a detects that the number of transmission equipments present on the ring network is "6" based on the contents of the data area. Then, the transmission equipment 1a generates six different node IDs. In this example, the transmission equipment 1a generates node IDs "01", "02", "03", "04", "05", and "06". Then, the transmission equipment 1a writes the generated node IDs to the data area of the topology setup frame. As a result, the data area is updated to a state where the node ID data "01,02,03,04,05, 06" is stored. Moreover, the transmission equipment 1a generates a topology setup frame 03 for transmitting this node ID data. Then, the transmission equipment 1a transmits the topology setup frame 03 to the transmission equipment 1b so that the topology setup frame 03 goes round the ring network.

Operations performed by the transmission equipments 1b to 1f hereafter are substantially the same as the operations described above with reference to FIG. 4. Namely, each of the transmission equipments 1b to 1f obtains a corresponding node ID and topology information based on the node ID data transmitted by the topology setup frame 03.

As described above, the method illustrated in FIGS. 2 to 4 includes the procedures with which each of the transmission equipments generates a temporary node ID and the particular transmission equipment determines whether or not the temporary node IDs are suitable. In contrast, with the method illustrated in FIG. 5, the particular transmission equipment collectively decides the node IDs of the transmission equipments, and each of the transmission equipments obtains corresponding node ID assigned to the local equipment. Accordingly, the method illustrated in FIG. 5 does not need the procedure of collecting the temporary node IDs from the transmission equipments after transmitting the topology setup frame 02. Note that the method illustrated in FIGS. 2 to 4 has an advantage such that a load imposed on the particular transmission equipment does not become heavy.

Figure 6:
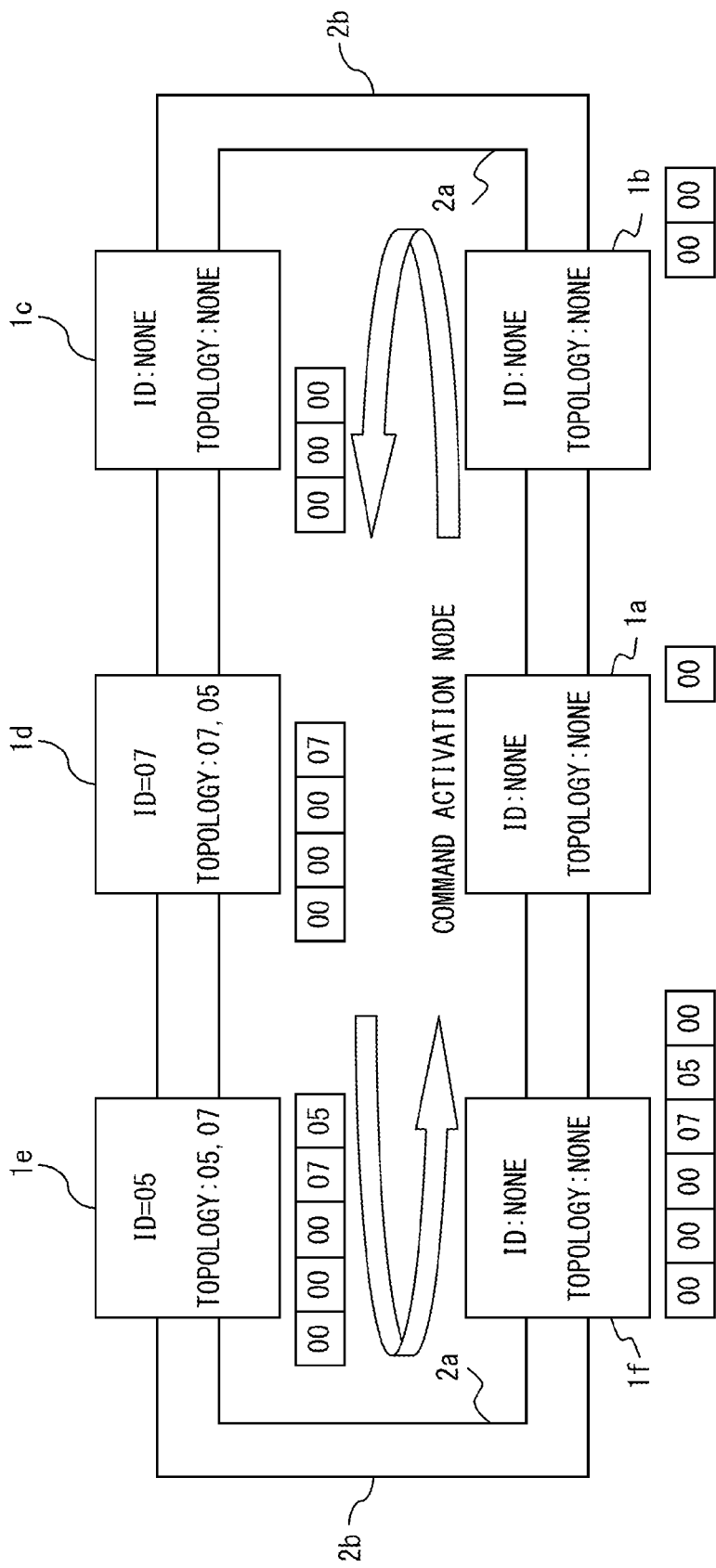
FIGS. 6 to 8 are explanatory diagrams of a network setup method executed when node IDs are assigned to some of transmission equipments.
Figure 7:
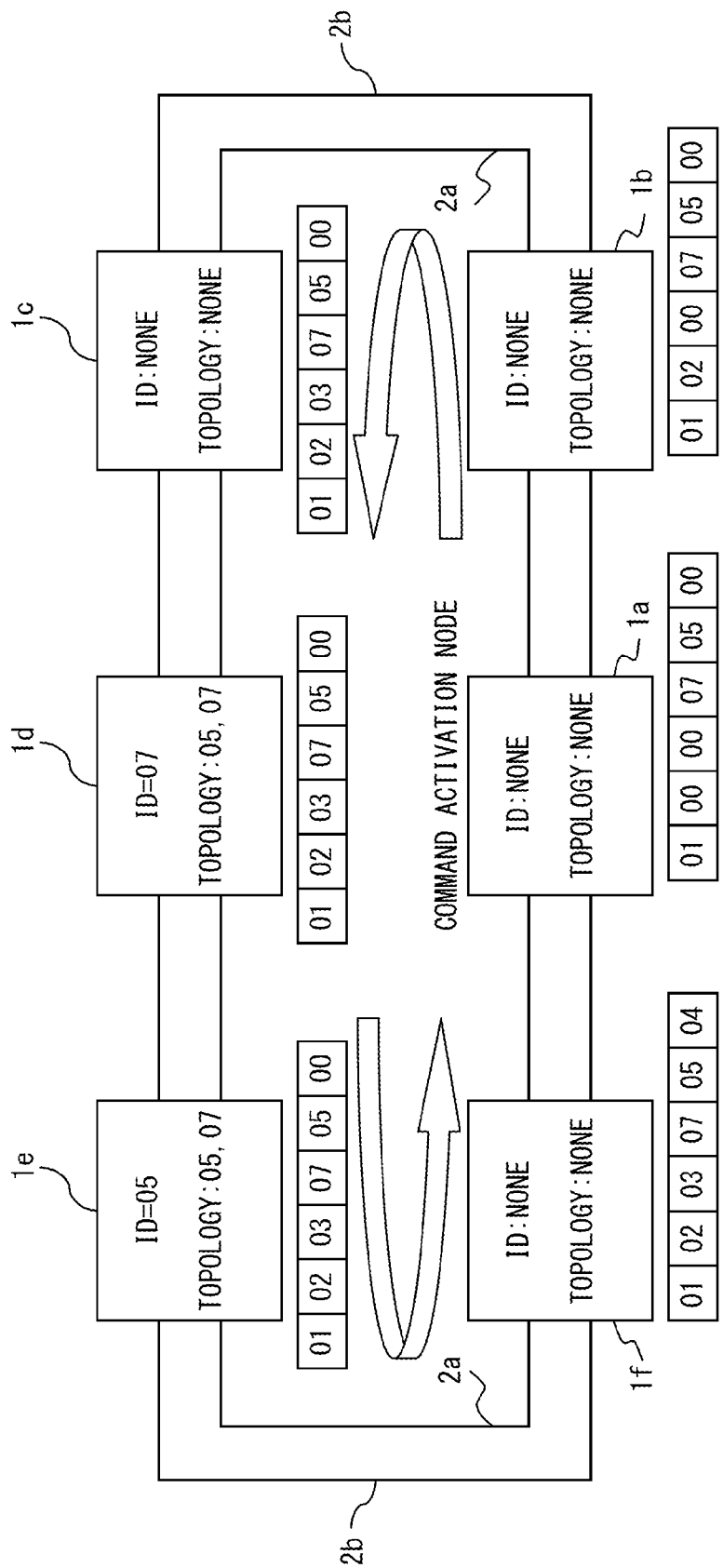
Figure 8:
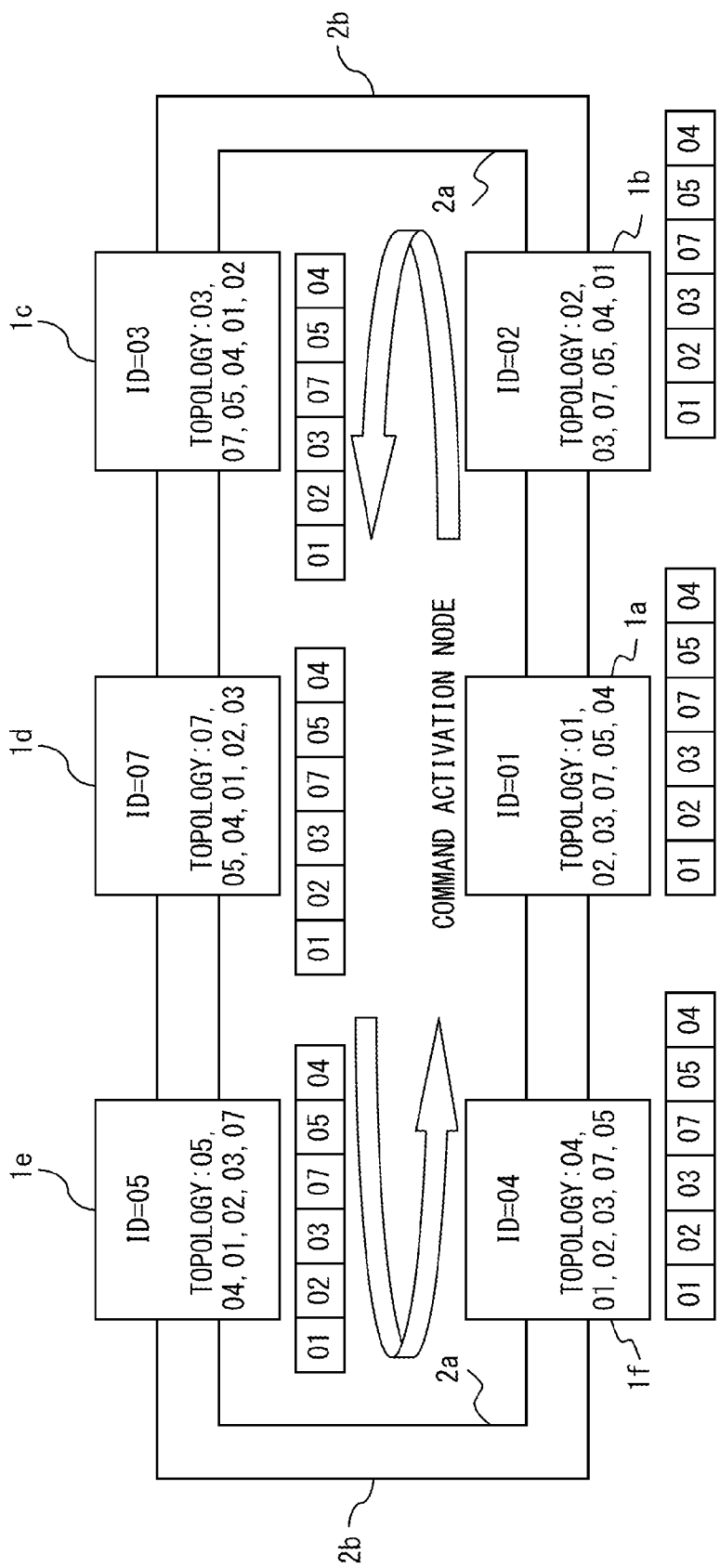

FIGS. 6 to 8 are explanatory diagrams of a network setup method executed when node IDs are assigned in advance to some of transmission equipments. Here, node IDs "07" and "05" are assigned to the transmission equipments 1d and 1e, respectively. Moreover, topology information "07,05" and "05,07" are set respectively in the transmission equipments 1d and 1e. Assume that a ring network is configured by connecting transmission equipments 1a, 1b, 1c, and 1f to the transmission equipments 1d and 1e. At this time, node IDs have not been assigned yet to the transmission equipments 1a, 1b, 1c, and 1f. Also in the following description, the transmission equipment 1a operates as particular transmission equipment.

(1) Detecting the Number of Nodes (FIG. 6)

The transmission equipment 1a transmits a topology setup frame 01 to the transmission equipment 1b so that the topology setup frame 01 goes round the ring network, as described above with reference to FIG. 2. When a node ID has not been assigned yet, each of the transmission equipments writes "00" to the data area of the topology setup frame 02 as described above with reference to FIG. 2. Namely, each of the transmission equipments 1a to 1c writes "00" to the data area. Accordingly, when the topology setup frame 01 is transmitted from the transmission equipment 1c to the transmission equipment 1d, the state of the data area is updated to "00,00,00".

Upon receipt of the topology setup frame 01, each of the transmission equipments to which a node ID is assigned writes the node ID of the local equipment to the end of the data area. Namely, upon receipt of the topology setup frame 01, the transmission equipment 1d appends "07" to the end of the data area. As a result, the data area is updated to "00,00,00,07". Similarly, upon receipt of the topology setup frame 01, the transmission equipment 1e appends "05" to the end of the data area. As a result, the data area is updated to "00,00,00,07,05". Then, the transmission equipment 1e transmits the topology setup frame 01 to the transmission equipment 1f.

To the transmission equipment 1f, the node ID has not been assigned yet at this time point. Accordingly, the transmission equipment 1f appends "00" to the end of the data area of the topology setup frame 01. As a result, the node ID data "00, 00,00,07,05,00" is stored in the data area of the topology setup frame 01 when the transmission equipment 1a receives the topology setup frame 01.

Upon receipt of the topology setup frame 01 from the transmission equipment 1f, the transmission equipment 1a detects the number of nodes on the ring network based on the contents of the data area. In this example, the node ID data includes six elements. Accordingly, the transmission equipment 1a determines that the number of nodes (namely, the number of transmission equipments) on the ring network is "6".

(2) Assigning a Temporary Node ID (FIG. 7)

The transmission equipment 1a transmits a topology setup frame 02 to the transmission equipment 1b so that the topology setup frame 02 goes round the ring network, as described above with reference to FIG. 3. At this time, the node ID data "00,00,00,07,05,00" is stored in the data area of the topology setup frame 02.

When a node ID has not been assigned yet, each of the transmission equipments generates a value other than temporary node IDs already written to the data area of the topology setup frame 02 as described above with reference to FIG. 3. Namely, the transmission equipment 1a generates a value other than "05" and "07" as a temporary node ID. In this example, the transmission equipment 1a generates a temporary node ID "01". Then, the transmission equipment 1a rewrites presence information that the transmission equipment 1a previously wrote to the data area to the temporary node ID newly generated by the transmission equipment 1a. As a result, the node ID data is updated from "00,00,00,07, 05,00" to "01,00,00,07,05,00".

The transmission equipments 1b and 1c respectively generate temporary node IDs "02" and "03". Then, the transmission equipments 1b and 1c update the data area of the topology setup frame 02 with the respectively generated temporary node IDs. As a result, the node ID data is updated to "01,02, 03,07,05,00".

Upon receipt of the topology setup frame 02, each of the transmission equipments to which the node ID has been assigned checks whether or not a node ID that the local equipment previously wrote to the data area is maintained. When the node ID of the local equipment is maintained in the data area, the transmission equipment does not update the data area. Alternatively, when the node ID of the local equipment is not maintained in the data area, the transmission equipment recognizes that the data area is corrupted, and issues an alarm. In this example, the fourth element of the node ID data is "07" when the transmission equipment 1d receives the topology setup frame 02. The fifth element of the node ID data is "05" when the transmission equipment 1e receives the topology setup frame 02. Accordingly, the transmission equipments 1d and 1e do not update the data area of the topology setup frame 02. Namely, the node ID data "01,02,03,07,05,00" is maintained in the data area of the topology setup frame 02 transmitted from the transmission equipment 1e to the transmission equipment 1f.

The transmission equipment 1f writes a temporary node ID "04" to the data area of the topology setup frame 02. As a result, the node ID data is updated to "01,02,03,07,05,04".

Upon receipt of the topology setup frame 02 from the transmission equipment 1f, the transmission equipment 1a determines whether or not the elements of the node ID data are different from each other as described above with reference to FIG. 3. When the elements of the node ID data are different from each other, the procedure of setting a node ID and topology information is started. In this example, the elements of the node ID data are the node IDs assigned to the transmission equipments 1d and 1e, and the temporary node IDs generated by the transmission equipments 1a, 1b, 1c, and 1f.

(3) Setting a Node ID and Topology Information (FIG. 8)

The transmission equipment 1a transmits a topology setup frame 03 to the transmission equipment 1b so that the topology setup frame 03 goes round the ring network, as described above with reference to FIG. 4. At this time, the node ID data "01,02,03,07,05,04" is stored in the data area.

Operations of each of the transmission equipments are substantially the same as the operations described above with reference to FIG. 4. Namely, each of the transmission equipments obtains a node ID and topology information based on the node ID data of the topology setup frame 03. At this time, each of the transmission equipments to which a node ID has been already assigned updates the topology information stored in the local equipment to new topology information obtained based on the node ID data of the topology setup frame 03. For example, the transmission equipment 1d updates the topology information from "07,05" to ""07,05, 04,01,02,03".

As described above, with the network setup method according to the embodiment, different node IDs are autonomously generated and respectively assigned to transmission equipments also when transmission equipment to which a node ID has not been assigned yet, and transmission equipment to which a node ID has been assigned are connected. Accordingly, also in this case, an operator who sets up or manages a network does not need to decide node IDs of transmission equipments, and different node IDs can easily be assigned to the transmission equipments even if the number of nodes increases.

The particular transmission equipment illustrated in FIG. 5 can collectively decide node IDs of the transmission equipments. Accordingly, when node IDs are assigned in advance to some of the transmission equipments, the particular transmission equipment illustrated in FIG. 5 collectively generates the node IDs of the remaining transmission equipments. For example, when the node IDs "07" and "05" are assigned in advance to the transmission equipments 1d and 1e as illustrated in FIG. 6, the particular transmission equipment illustrated in FIG. 5 assigns node IDs other than "07" and "05" to the transmission equipments 1a, 1b, 1c, and 1f.

Figure 9:
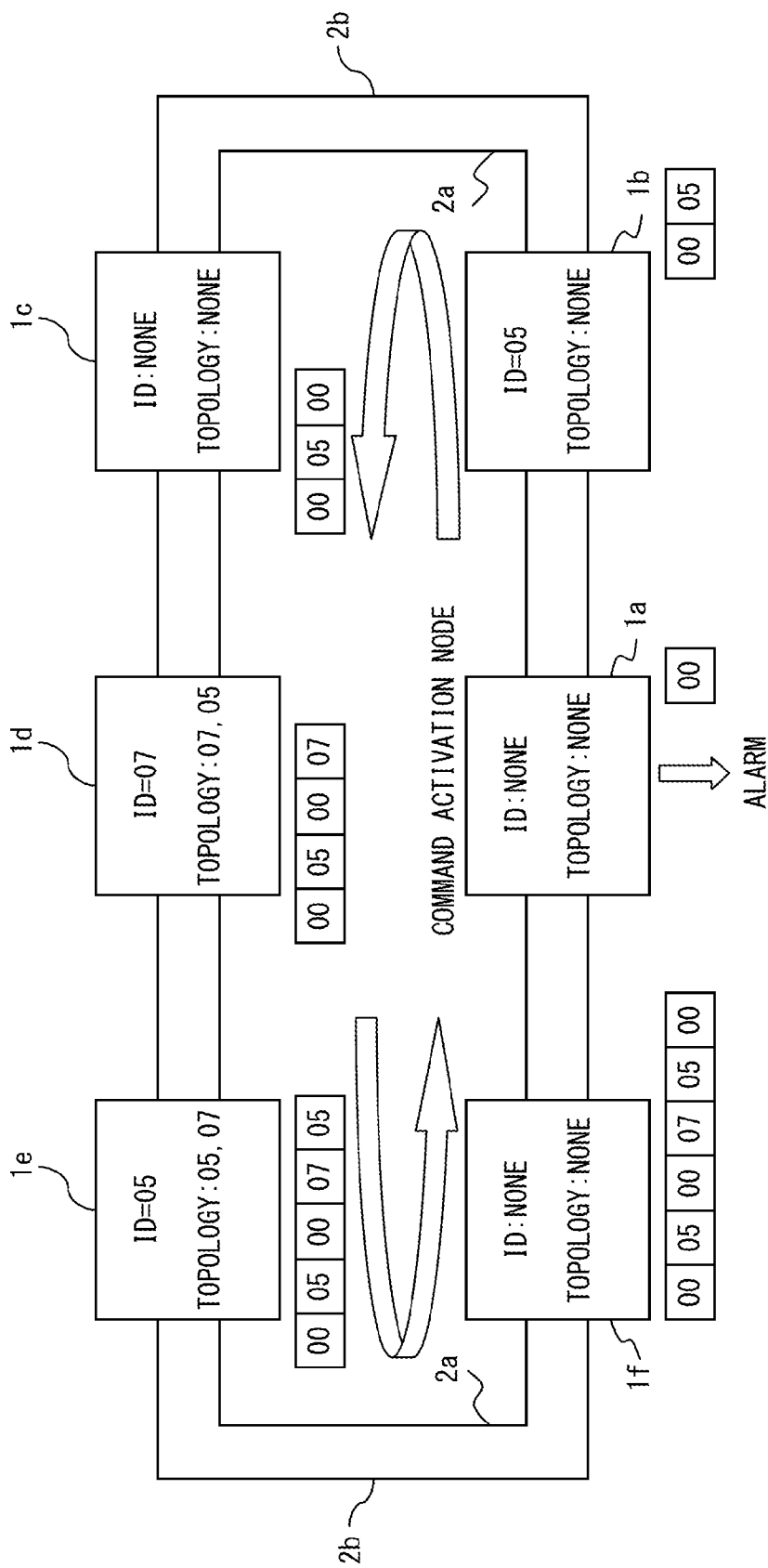
FIG. 9 is an explanatory diagram of a process executed when a node ID is redundantly assigned.

FIG. 9 is an explanatory diagram of a process executed when the same node ID is redundantly assigned to a plurality of transmission equipments. In the example illustrated in FIG. 9, node IDs "05", "07", and "05" are respectively assigned to the transmission equipments 1b, 1d, and 1e. Namely, the same node ID is redundantly assigned to the transmission equipments 1b and 1e. Assume that a ring network is set up by connecting the transmission equipments 1a to 1f in such a situation.

The transmission equipment 1a transmits a topology setup frame 01 to the transmission equipment 1b so that the topology setup frame 01 goes round the ring network, as described above with reference to FIG. 2 or FIG. 6. Operations of the transmission equipments upon receipt of the topology setup frame 01 are as described above. Namely, the transmission equipments 1a, 1c, and 1f to which a node ID is not assigned respectively write "00" to a data area of the topology setup frame 01. Moreover, the transmission equipments 1b, 1d, and 1e respectively write "05", "07", and "05" to the data area of the topology setup frame 01. As a result, node ID data "00, 05,00,07,05,00" is stored in the data area of the topology setup frame 01 when the transmission equipment 1a receives the frame.

Upon receipt of the topology setup frame 01 from the transmission equipment 1f, the transmission equipment 1a detects the number of nodes on the ring network based on contents of the data area. Moreover, the transmission equipment 1a determines whether or not elements of the node ID data stored in the data area are different from each other. Note that, however, the transmission equipment 1a permits a state where "00" is redundant. In this example, both the second and the fifth elements of the node ID data are "05", which is redundant. Thus, the transmission equipment 1a determines that the node IDs are assigned unsuitably. In this case, the transmission equipment 1a issues an alarm (or an error message) representing that the node ID is redundant. The alarm is, but not particularly limited to, for example, displayed on a display device connected to the transmission equipment 1a. Alternatively, the transmission equipment 1a may notify a network management system (NMS), not illustrated, of the alarm.

Upon detection of the alarm, an operator who sets up or manages the network, for example, initializes the node ID in either of the transmission equipments to which the redundant node ID is assigned. For example, the operator manually deletes the node ID set in the transmission equipment 1b. Thereafter, the operator causes the transmission equipment 1a to execute the network setup method. In this case, unique node IDs are respectively assigned to the transmission equipments with the procedures illustrated in FIGS. 6 to 8.

Note that the operator may initialize the node IDs of all the transmission equipments to which the redundant node ID is assigned. Alternatively, the operator may initialize the node IDs of all the transmission equipments on the ring network.

Additionally, in the above described example, the particular transmission equipment detects that the node ID is redundant upon receipt of the topology setup frame 01. The network setup method according to the embodiment is not limited to this procedure. Namely, the particular transmission equipment determines whether or not a node ID is redundant upon receipt of the topology setup frame 02. Accordingly, the particular transmission equipment does not need to determine whether or not anode ID is redundant upon receipt of the topology setup frame 01.

As described above, with the network setup method according to the embodiment, an alarm is issued if the same node ID is erroneously assigned to a plurality of transmission equipments. Accordingly, an operator can correct the erroneous assignment of a node ID at an early stage when he or she sets up a network.

Figure 10:
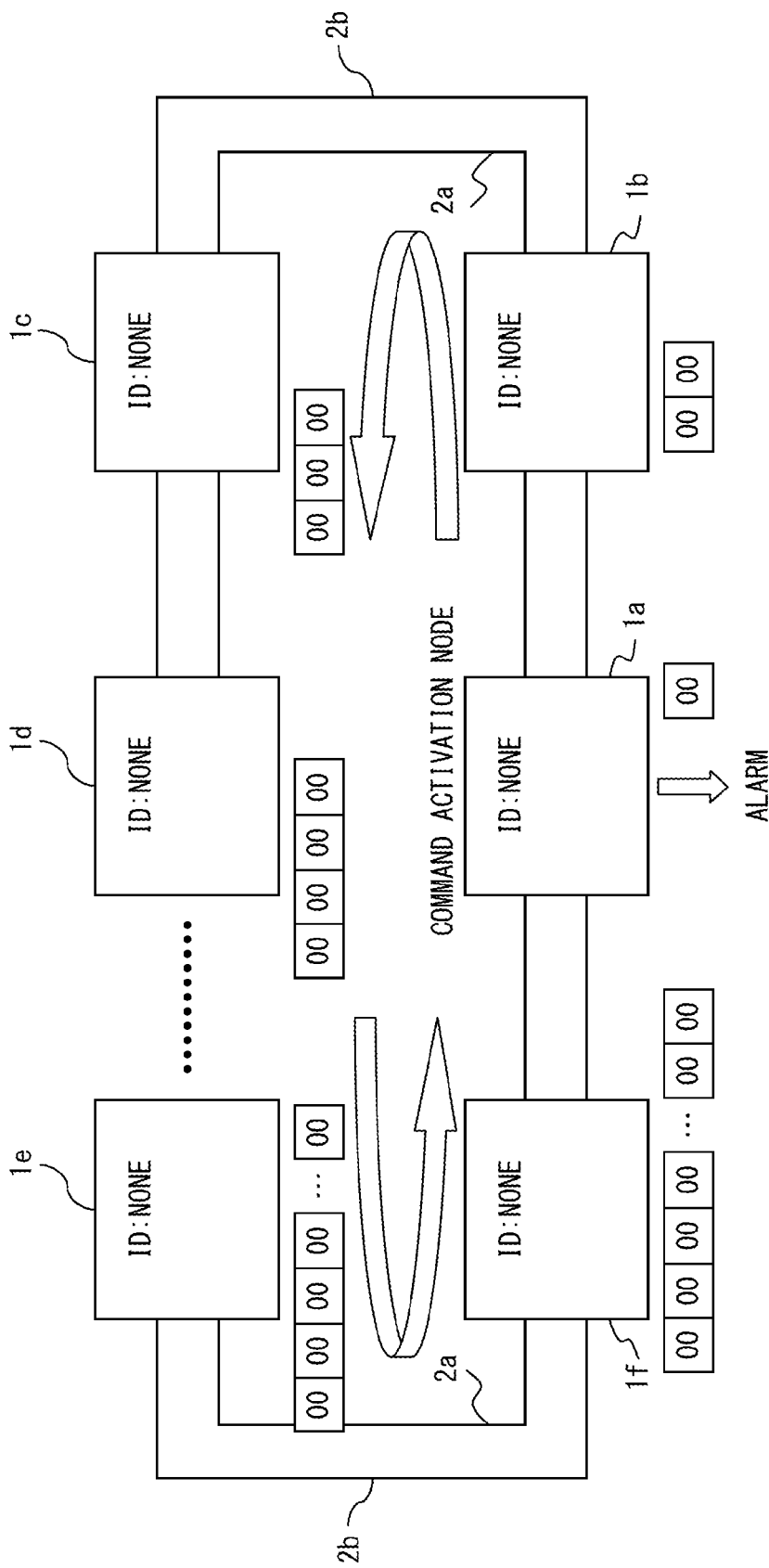
FIG. 10 is an explanatory diagram of a process executed when the number of nodes exceeds an allowable number.

FIG. 10 is an explanatory diagram of a process executed when the number of nodes exceeds an allowable number. Assume that a ring network illustrated in FIG. 10 includes transmission equipments, not illustrated, between the transmission equipments 1d and 1e in addition to the transmission equipments 1a to 1f. This example also assumes that an allowable number of transmission equipments that can be arranged on the ring network is "254". Accordingly, node IDs that can be assigned to the transmission equipments range from 1 to 254 (FE in hexadecimal notation). The example illustrated in FIG. 10 further assumes that N (N is an integer larger than 254) including the transmission equipments 1a to 1f are connected in the form of a ring.

As described above with reference to FIG. 2, the transmission equipment 1a transmits a topology setup frame 01 so that the topology setup frame 01 goes round the ring network. Then, the transmission equipments respectively write "00" to the data area of the topology setup frame 01. Accordingly, N elements (namely, N "00"s) are written in a data area of the topology setup frame 01 that the transmission equipment 1a receives from the transmission equipment 1f.

Upon receipt of the topology setup frame 01, the transmission equipment 1a counts the number of elements in the data area of the frame. In this example, the number of elements (namely, N) written in the data area exceeds the allowable number. Accordingly, the transmission equipment 1a issues an alarm (or an error message) representing that the number of nodes exceeds the allowable number.

Figure 11:
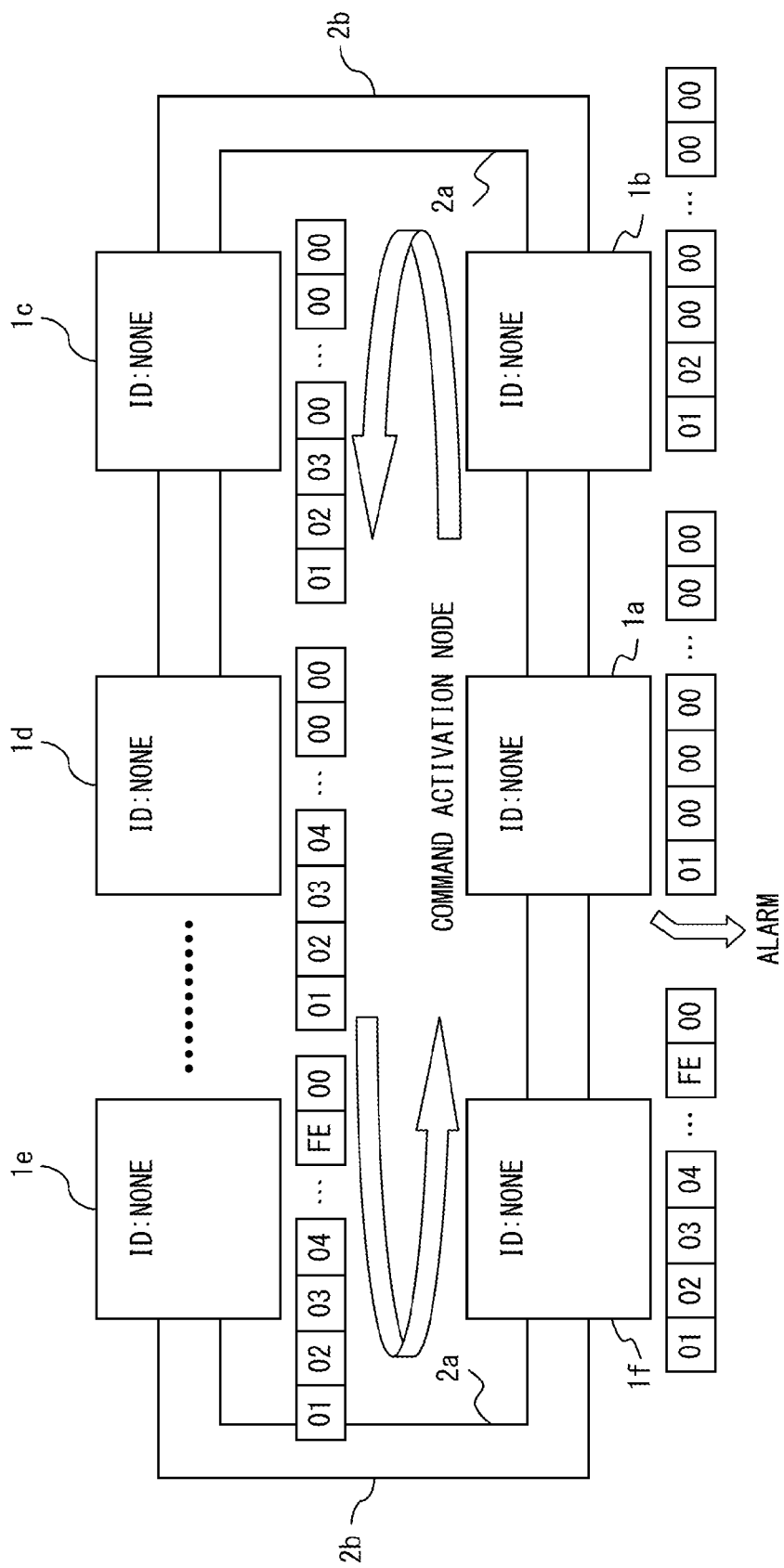
FIG. 11 is an explanatory diagram of another process executed when the number of nodes exceeds the allowable number.

FIG. 11 is an explanatory diagram of another process executed when the number of nodes exceeds the allowable number. FIG. 11 illustrates a procedure executed after the transmission equipment 1a has received the topology setup frame 01 from the transmission equipment 1f with the procedure illustrated in FIG. 10.

As described above with reference to FIG. 3, the transmission equipment 1a transmits a topology setup frame 02 so that the frame goes round the ring network. Then, each of the transmission equipments generates a temporary node ID, and writes the generated temporary node ID to the data area of the topology setup frame 02. At this time, each of the transmission equipments generates a value other than temporary node IDs written earlier by the other transmission equipments to the data area of the topology setup frame 02. Then, each of the transmission equipments rewrites presence information "00"

that the local equipment previously wrote to the data area to the temporary node ID of the local equipment.

Here, the example illustrated in FIG. 11 assumes that 255 transmission equipments (including the transmission equipments 1a to 1f) are connected in the form of a ring. Namely, assuming that the transmission equipment 1a is the first equipment, the transmission equipments 1e and 1f are arranged respectively in 254th and 255th nodes. Also assume that each of the transmission equipments selects a minimum value among unused temporary node IDs. Namely, the transmission equipments 1a, 1b, 1c . . . respectively select temporary node IDs "01", "02", "03" . . . .

In this case, upon receipt of the topology setup frame 02, the transmission equipment 1e generates a temporary node ID 254 (FE in hexadecimal notation), and writes the generated temporary node ID to the data area. At this time, the transmission equipment 1e is arranged at the second last node with respect to the transmission equipment 1a. Accordingly, the transmission equipment 1e updates the second last element of the node ID data from "00" to "FE". As a result, the node ID data is updated to "01, 02, 03, 04, . . . , FE, 00". Then, the transmission equipment 1e transmits the topology setup frame 02 to the transmission equipment 1f.

Upon receipt of the topology setup frame 02 from the transmission equipment 1e, the transmission equipment 1f searches for a temporary node ID that is not used by the other transmission equipments from among the node IDs "1" to "FE" that can be assigned to the transmission equipments on the ring network. In the example illustrated in FIG. 11, however, all temporary node IDs have been already used while the topology setup frame 02 is transmitted from the transmission equipment 1a up to the transmission equipment 1e. Accordingly, the transmission equipment 1f does not select a temporary node ID.

In this case, the transmission equipment 1f transmits the topology setup frame 02 to the transmission equipment 1a without updating the data area of the frame. Namely, when the transmission equipment 1f transmits the topology setup frame 02 to the transmission equipment 1a, the node ID data stored in the data area is "01, 02, 03, 04, . . . , FE, 00".

Upon receipt of the topology setup frame 02 from the transmission equipment 1f, the transmission equipment 1a determines whether or not the node ID data stored in the data area includes "00". When the node ID data includes "00", the transmission equipment 1a determines that transmission equipment that does not obtain a temporary node ID is present on the ring network. Namely, the transmission equipment 1a determines that the number of transmission equipments arranged on the ring network exceeds the allowable number. In the example illustrated in FIG. 11, the last element of the node ID data is "00". Therefore, the transmission equipment 1a issues an alarm (or an error message) representing that the number of nodes exceeds the allowable number.

As described above, with the network setup method according to the embodiment, an alarm is issued when the number of transmission equipments exceeds the allowable number. Accordingly, the same node ID is not erroneously assigned to a plurality of transmission equipments. In the example illustrated in FIG. 10 or FIG. 11, an operator who sets up or manages the network, for example, disconnects one or a plurality of transmission equipments from the ring network when the alarm is issued.

Figure 12:
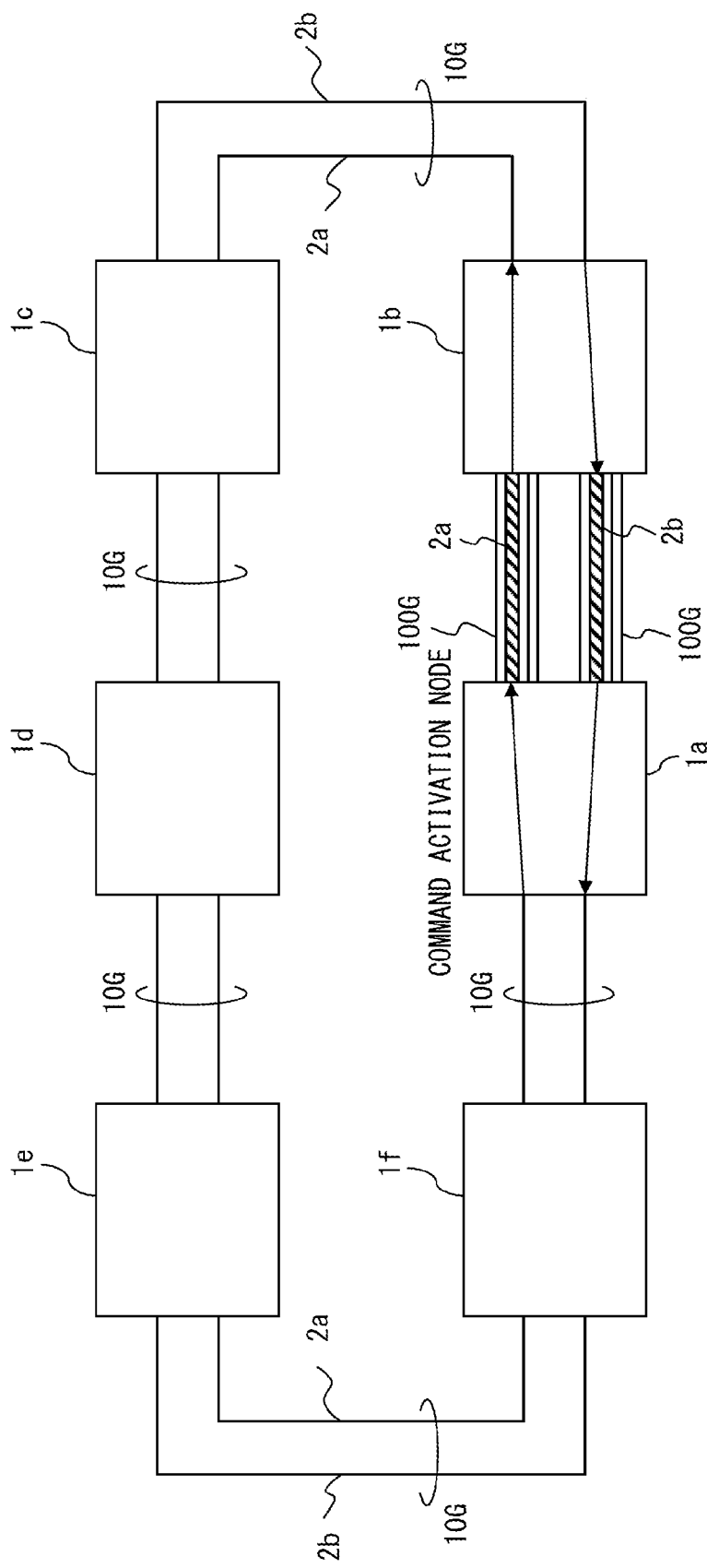
FIG. 12 is an explanatory diagram of a process executed when a bandwidth of some of sections is different from other sections.

FIG. 12 is an explanatory diagram of a process executed when a bandwidth of some of sections within the ring network is different from that of the other sections. In the example illustrated in FIG. 12, a bandwidth of transmission lines between the transmission equipments 1a and 1b is 100 Gbit/s, and that of the other sections is 10 Gbit/s.

In this case, topology setup frames 01 to 03 include bandwidth data for setting a bandwidth to be used. The bandwidth data designates a channel used for a BLSR communication from among a plurality of channels configurable in a transmission line. Assume that channels #1 to #10 are prepared in the transmission lines between the transmission equipments 1a and 1b. Also assume that the transmission equipments 1a and 1b use the channel #1 in order to implement BLSR communication. Here, the bandwidth of the channel #1 is 10 Gbit/s.

In this case, information indicating that the channel #1 is used for the BLSR communication is stored in the transmission equipments 1a and 1b. The transmission equipment 1a sets "#1" as the bandwidth data when the transmission equipment 1a transmits a topology setup frame to the transmission equipment 1b. In contrast, the transmission equipment 1b resets the bandwidth data upon receipt of the topology setup frame from the transmission equipment 1a.

With this configuration, the transmission equipments 1a and 1b (and the transmission lines between the transmission equipments 1a and 1b) can provide a plurality of BLSRs. For example, a BLSR communication performed by the transmission equipments 1a to 1f may use the channel #1, and another BLSR communication performed by transmission equipments including the transmission equipments 1a and 1b may use the channel #2. Note that the bandwidth data may be implemented by designating a channel with the use of an MFAS (Multi Frame Alignment Signal) value of OTN.

FIG. 13 illustrates an example of a topology setup frame. In this example, the topology setup frame includes Frame data, Cmd data, Version data, length data, unique data, Eslot data, MyNodeID, NearNode ID, and CRC as illustrated in FIG. 13.

The Frame data is used to detect the start position of the topology setup frame. The Frame data is a fixed value F6F6 in this example.

The Cmd data is a command identifier for identifying a type of a command as follows.

00: End command (notifying each transmission equipment to terminate the network setup procedures)
01: Node number detection command (instructing each transmission equipment to write presence information or a node ID to a data area of the topology setup frame)
02: Temporary assignment command (instructing each transmission equipment to write a temporary node ID or a node ID to the data area of the topology setup frame)
03: Obtain command (instructing each transmission equipment to obtain a node ID (and topology information) from the topology setup frame)
04: Abort command (notifying each transmission equipment to abort (or abnormally terminate) the network setup procedures.

The Version data indicates a version of a topology setup frame. The length data indicates a valid data length from the length data to the CRC data. The unique data identifies particular transmission equipment for generating and transmitting a topology setup frame. In this example, the unique data is 6 bytes, and includes unique0 to unique5. Moreover, a MAC address of the particular transmission equipment (the transmission equipment 1a in the embodiment illustrated in FIGS. 2 to 12) is used as the unique data. The Eslot (Enhanced slot) data identifies a channel used for BLSR communication if a bandwidth of some of sections within a ring network is different from that of the other sections. Note that the Eslot data is equivalent to the bandwidth data described above with reference to FIG. 12.

The MyNodeID area for storing MyNodeID is used by particular transmission equipment for generating and transmitting a topology setup frame. The MyNodeID is equivalent to presence information, a temporary node ID, or a node ID of the particular transmission equipment.

The NearNodeID area for storing NearNodeID is used by transmission equipments other than the particular transmission equipment on the ring network. For example, NearNode1 area and NearNode2 area are respectively used by the first transmission equipment and the second transmission equipment with respect to the particular transmission equipment on a transmission line of an active system. Accordingly, a length of the NearNodeID area varies depending on the number of transmission equipments arranged on the ring network.

When the particular transmission equipment initially generates a topology setup frame, the topology setup frame includes no NearNodeID areas. After the particular transmission equipment transmits the topology setup frame, each of the transmission equipments adds presence information "00" to the topology setup frame, as described above with reference to FIG. 2. At this time, each of the transmission equipments adds a NearNodeID area for the local equipment within the topology setup frame, and writes the presence information to the added NearNodeID area. Thus, NearNodeID areas respectively corresponding to the transmission equipments other than the particular transmission equipment are created within the topology setup frame. Note that NearNodeID is equivalent to presence information, a temporary node ID, or a node ID of corresponding transmission equipment.

The CRC represents a result obtained by performing a CRC computation for valid data (namely, from Frame to NearNodeID) of the topology setup frame. Each of the transmission equipments performs, for example, the following CRC16 as the CRC computation.

$$CRC = x^{16} + x^{12} + x^5 + 1$$

The topology setup frame in the above described format is transmitted by using, but not particularly limited to, for example, part of an OTU/ODU/OPU overhead in an GIN architecture. The OTU/ODU/OPU overhead includes Frame Alignment overhead, OTUk overhead, ODUk overhead, and OPUk overhead as illustrated in FIG. 14. The OTUk overhead includes a reserved area of 2 bytes, and the ODUk overhead includes a reserved area of 6 bytes. The reserved areas are unused areas.

When the OTU/ODU/OPU overhead is used, transmission equipment may transmit a topology setup frame with a multiframe scheme. Assume that a data length of the topology setup frame is 50 bytes. Also assume that the transmission equipment transmits the topology setup frame by using a reserved area of 1 byte within the OTU/ODU/OPU overhead. In this case, one topology setup frame is transmitted by using 50 OTN frames.

Figure 15:
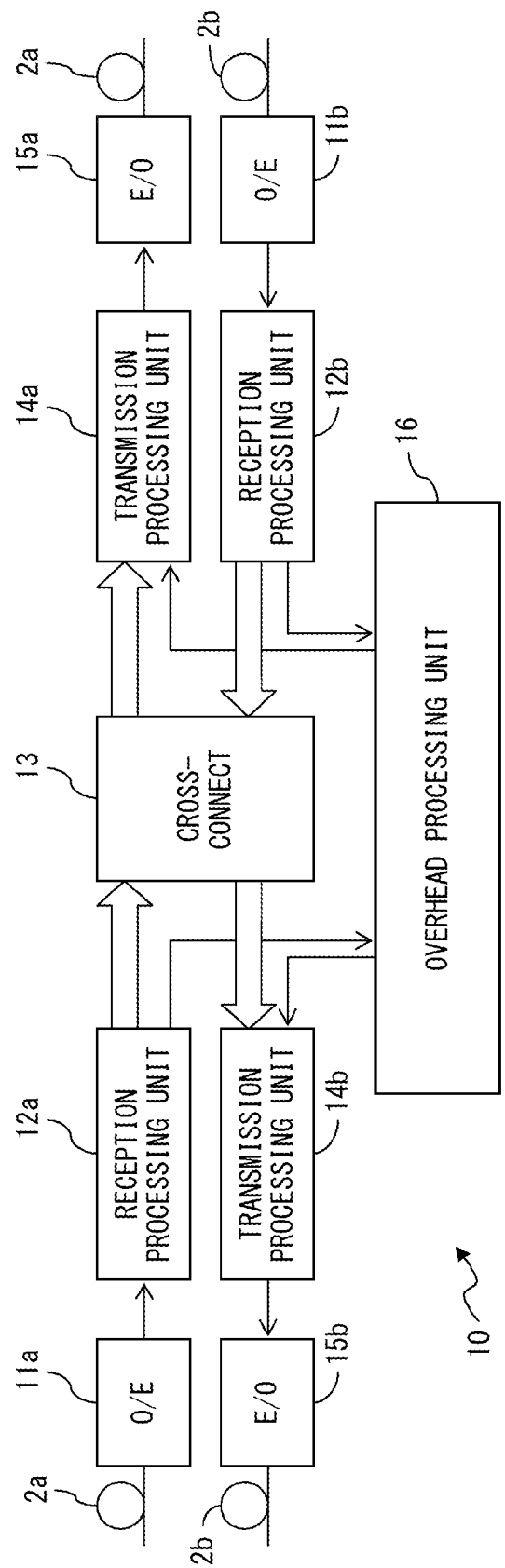
FIG. 15 illustrates a configuration of transmission equipment.

FIG. 15 illustrates a configuration of transmission equipment. Assume that the transmission equipment is used on a ring network implemented by one pair of transmission lines (an active system and a standby system). Also assume that the transmission equipment transmits a topology setup frame of the embodiment by using an overhead of a transmission frame of the ring network.

The transmission equipment 10 includes optical receivers 11a, 11b, reception processing units 12a, 12b, a cross-connect 13, transmission processing units 14a, 14b, optical transmitters 15a, 15b, and an overhead processing unit 16. The optical receiver 11a, the reception processing unit 12a, the transmission processing unit 14a and the optical transmitter 15a, and the optical receiver 11b, the reception processing unit 12b, the transmission processing unit 14b and the optical transmitter 15b transmit and receive a signal respectively in reverse directions. One half of a bandwidth of a signal is allocated for an active system, whereas the other half of the bandwidth is allocated for a standby system respectively in the directions. The transmission equipment 10 is equivalent to each of the transmission equipments 1a to 1f illustrated in FIG. 1.

The optical receiver 11a includes a E/O conversion element, and converts an optical signal received from transmission equipment on an upstream side into an electric signal. The reception processing unit 12a guides a signal obtained by the optical receiver 11a to the cross-connect 13, extracts an overhead portion from the signal obtained by the optical receiver 11a, and guides the extracted overhead portion to the overhead processing unit 16. For example, in an OTN architecture, the reception processing unit 12a guides the OTU/ODU/OPU overhead illustrated in FIG. 14 or part of the overhead to the overhead processing unit 16.

The cross-connect 13 guides the signal output from the reception processing unit 12a to the transmission processing unit 14a, and also guides the signal output from the reception processing unit 12b to the transmission processing unit 14b. However, for example, when a fault occurs on the ring network, the cross-connect 13 guides the signal output from the reception processing unit 12a to the transmission processing unit 14b, and also guides the signal output from the reception processing unit 12b to the transmission processing unit 14a in some cases. When the transmission equipment 10 operates as an OADM (Optical Add Drop Multiplexer), the cross-connect 13 may guide the signal output from the reception processing unit 12a to a client line not illustrated, and may guide a client signal from a client line not illustrated to the transmission processing unit 14a.

The transmission processing unit 14a guides the signal output from the cross-connect 13 to the optical transmitter 15a. At this time, the transmission processing unit 14a replaces the overhead portion of the signal output from the cross-connect 13 with an overhead generated by the overhead processing unit 16 as necessary. The optical transmitter 15a converts the signal transmitted from the transmission processing unit 14a into an optical signal. Then, the optical transmitter 15a transmits the optical signal to transmission equipment on a downstream side via the transmission line 2a. Since operations of the optical receiver 11b, the reception processing unit 12b, the transmission processing unit 14b and the optical transmitter 15b are substantially identical to those of the optical receiver 11a, the reception processing unit 12a, the transmission processing unit 14a and the optical transmitter 15a, explanations of these components are omitted.

The overhead processing unit 16 executes a specified process based on an overhead extracted from a transmission frame (for example, an OTN frame), and updates the overhead if needed. Moreover, the overhead processing unit 16 executes a process according to a topology setup frame transmitted by using the overhead.

Figure 16:
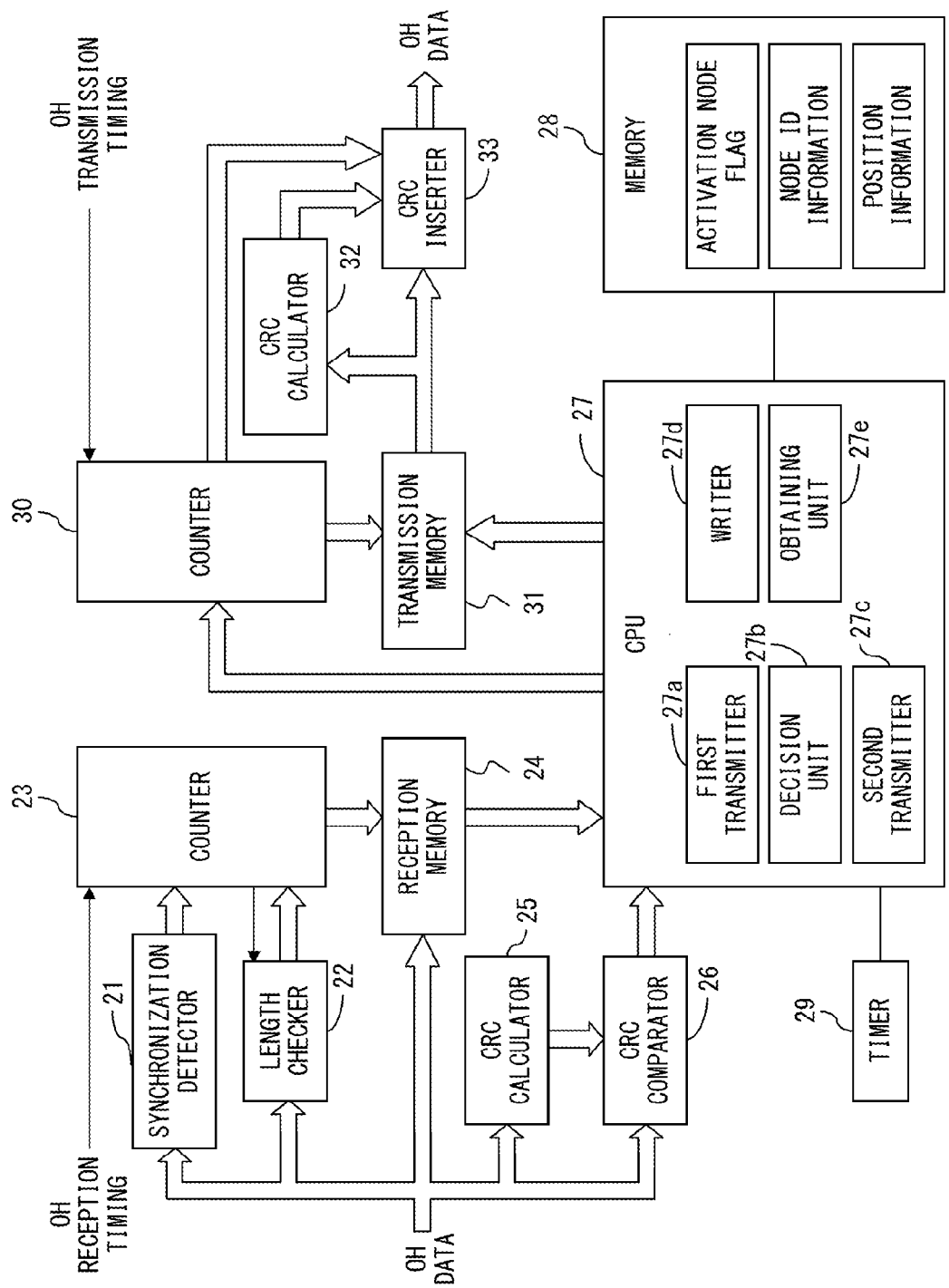
FIG. 16 illustrates a configuration of an overhead processing unit.

FIG. 16 illustrates a configuration of the overhead processing unit 16. Here, FIG. 16 illustrates functions related to the network setup method according to the embodiment. Although the overhead processing unit 16 includes circuits intended for different transmission directions, FIG. 16 illustrates only one of the directions. Note that the circuits intended for both of the transmission directions have substantially the same configuration. In addition, assume that the transmission equipment 10 transmits the topology setup frame illustrated in FIG. 13 by using an overhead of a transmission frame.

The overhead processing unit 16 includes a synchronization detector 21, a length checker 22, a counter 23, a reception memory 24, a CRC calculator 25, a CRC comparator 26, a CPU 27, a memory 28, a timer 29, a counter 30, a transmission memory 31, a CRC calculator 32, and a CRC inserter 33. To the overhead processing unit 16, overhead data is provided from the reception processing unit 12a. Also an overhead reception timing signal and an overhead transmission timing signal are provided to the overhead processing unit 16.

The synchronization detector 21 detects the start of a topology setup frame based on the overhead data. Namely, the synchronization detector 21 detects "Frame" of the topology setup frame illustrated in FIG. 13. The length checker 22 detects a valid data length of the topology setup frame. Namely, the length checker 22 obtains the length data illustrated in FIG. 13 according to reception timing notified from the counter 23.

The counter 23 notifies the length checker 22 of the reception timing of the length data with respect to the start of the topology setup frame. Moreover, the counter 23 references the length data that indicates the valid data length of the topology setup frame, and generates a timing signal that indicates the end of the topology setup frame. The reception memory 24 stores the topology setup frame by using the timing signal generated by the counter 23.

The CRC calculator 25 calculates a CRC value of the topology setup frame data extracted from the overhead data. The CRC comparator 26 makes a comparison between the CRC value recorded at the end of the topology setup frame extracted from the overhead data and that obtained by the CRC calculator 25. Then, the CRC comparator 26 notifies the CPU 27 of a result of the comparison.

The CPU 27 executes processes related to the network setup method according to the embodiment based on topology setup frame data extracted from the overhead data. At this time, the CPU 27 generates transmission data by rewriting Cmd data, length data, Eslot data, and/or NearNodeID of the topology setup frame extracted from the overhead data if needed. The processes of the CPU 27 will be described in detail later with reference to flowcharts.

The memory 28 is used as a working area of the CPU 27. The memory 28 stores information related to the network setup method according to the embodiment. In this example, the memory 28 stores at least an activation node flag, node ID information, and position information. The activation node flag indicates whether or not the transmission equipment 10 operates as a command activation node. The node ID information indicates a node ID assigned to the transmission equipment 10. The position information indicates a position (namely, one of NearNode1 to NearNode253) to which the transmission equipment 10 writes ID data of the local equipment in a process that the transmission equipment 10 writes the ID data of the local equipment to the data area of the topology setup frame. Here, the ID data means presence information, a temporary node ID, and/or a node ID. The timer 29 measures time period according to an instruction of the CPU 27.

The counter 30 references the length data generated by the CPU 27, and notifies the transmission memory 31 and the CRC inserter 33 of the timing of the end of the transmission data. The transmission memory 31 stores the transmission data generated by the CPU 27, and outputs the transmission data according to a notification from the counter 30.

The CRC calculator 32 calculates a CRC value of the transmission data output from the transmission memory 31. The CRC inserter 33 appends the CRC value obtained by the CRC calculator 32 to the transmission data output from the transmission memory 31 according to the notification from the counter 30. Thus, a new topology setup frame is generated.

The CPU 27 provides at least one of the network setup method illustrated in FIGS. 2 to 12 by executing a program that describes the processes represented by the flowcharts to be described later. The program related to the network setup method is, for example, stored in the memory 28.

If the transmission equipment 10 operates as the command activation node (namely, the particular transmission equipment), the CPU 27 may provide a first transmitter 27a, a decision unit 27b, and a second transmitter 27c. The first transmitter 27a transmits a frame including a command for instructing each transmission equipment to write an ID according to a specified rule. An example of the "frame" is the topology setup frame 02. An example of the "command" is the command Cmd02. An example of the "ID" is a temporary node ID. An example of the "specified rule" is, but not particularly limited to, writing a local ID to an area next to an area to which immediately preceding transmission equipment writes an ID. For example, in FIG. 3, when the transmission equipment 1b writes a temporary node ID to the second sub-area of the topology setup frame 02, the transmission equipment 1c writes a temporary node ID to the third sub-area.

The decision unit 27b determines whether or not a plurality of IDs written by the transmission equipments to the frame satisfy a specified condition. An example of the "specified condition" is that a plurality of IDs are different from each other. The decision unit 27b may determine whether or not another condition is satisfied.

The second transmitter 27c transmits a frame including a command for instruction each transmission equipment to obtain the plurality of IDs and a corresponding ID from among the plurality of IDs according to the above described rule when the plurality of IDs satisfy the above described condition. An example of the "frame" is the topology setup frame 03. An example of the "command" is the command Cmd03. The above described rule is equivalent to a rule of a command included in a frame transmitted by the first transmitter 27a. Accordingly, when the plurality of IDs that are written by the transmission equipments to the frame satisfy the above described condition, each of the transmission equipments obtains an ID that the local equipment previously wrote to the frame.

If the transmission equipment 10 is not the command activation node, the CPU 27 may provide a writer 27d and an obtaining unit 27e. The writer 27d writes an ID to the frame that goes round the ring network according to a specified rule. The obtaining unit 27e obtains a corresponding ID according to the rule from the frame that includes a plurality of IDs written by the transmission equipments to the frame, which is generated when the plurality of IDs satisfy a specified condition, and goes round the ring network.

Figure 17:
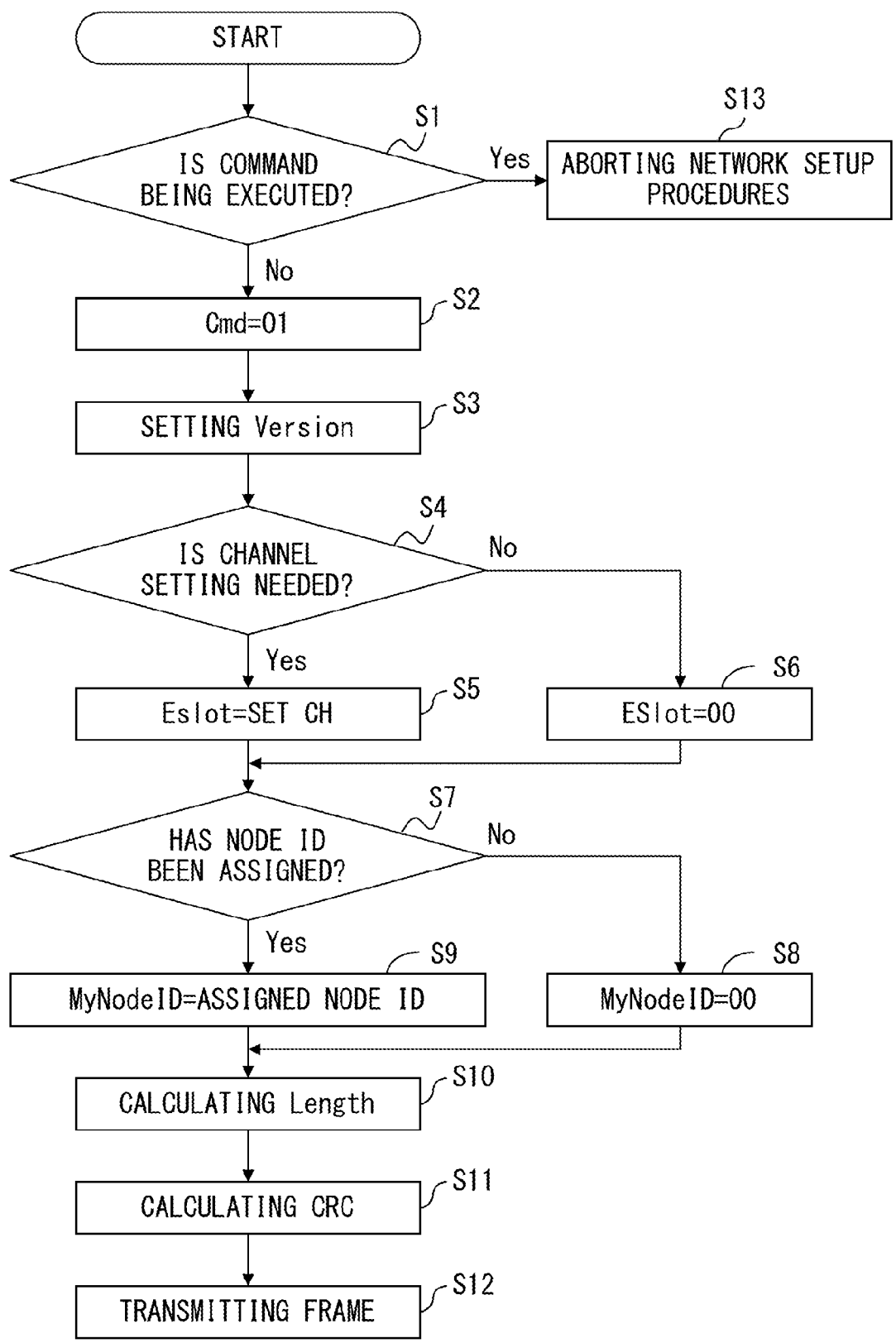
FIG. 17 is a flowchart illustrating a process for transmitting a topology setup frame when the network setup method is started.

FIG. 17 is a flowchart illustrating a process for transmitting a topology setup frame when the network setup method is started. The process represented by this flowchart is executed by particular transmission equipment (namely, a command activation node) selected by an operator who sets up or manages a network. The particular transmission equipment executes the process represented by this flowchart, for example, when the particular transmission equipment accepts an instruction for starting a network setup from the operator.

In S1, the CPU 27 checks whether or not a command related to a topology setup is being executed on a ring network. In this example, the CPU 27 sets a running flag, for example, when the particular transmission equipment has generated a topology setup frame 01 or when the particular transmission equipment has received a topology setup frame 01 from another transmission equipment. Moreover, the CPU 27 resets the running flag, for example, upon receipt of the end command or the abort command. Namely, when the running flag is set, the CPU 27 determines that the command is being executed on the ring network. Note that the command related to the topology setup corresponds to any of the commands Cmd01 to Cmd03.

When the command related to the topology setup is not being executed, the CPU 27 executes S2 to S12. Alternatively, when the command is being executed, the CPU 27 aborts the network setup procedures in S13 in order to avoid a state where a plurality of commands are simultaneously executed on the ring network.

In S2, the CPU 27 writes "01" to Cmd data area. In S3, the CPU 27 writes a version data of the topology setup frame to Version data area.

In S4, the CPU 27 determines whether or not a channel setting is needed. Namely, on a ring network where a bandwidth of some of sections is different from that of the other sections, the CPU 27 determines whether or not to transmit a signal by using part of a bandwidth of a transmission line. For instance, in the example illustrated in FIG. 12, the transmission equipment 1a makes a channel setting.

When the channel setting is needed, the CPU 27 writes a value for identifying a channel intended to transmit an optical signal to Eslot data area in S5. Alternatively, when the channel setting is not needed, the CPU 27 writes "00" to the Eslot data area in S6.

In S7, the CPU 27 determines whether or not a node ID has been already assigned to the transmission equipment where this CPU 27 is implemented. Namely, the CPU 27 determines whether or not node ID information is stored in the memory 28. When the node ID has not been assigned yet to the transmission equipment, the CPU 27 writes "00" to MyNodeID area in S8. In contrast, when the node ID has been already assigned to the transmission equipment, the CPU 27 writes the node ID stored in the memory 28 to the MyNodeID area in S9. Note that at this time point, the transmission data does not include NearNodeID area.

In S10, the CPU 27 calculates a data length of the transmission data. Here, the transmission data includes Frame data, Cmd data, Version data, length data, unique data, Eslot data, and MyNodeID. Note that all the Frame data, the Cmd data, the Version data, the length data, the unique data, the Eslot data and the MyNode ID have a fixed length. The frame data and the unique data respectively have a fixed value. The CPU 27 writes the calculated data length to the length data area. Then, the CPU 27 stores the generated transmission data in the transmission memory 31.

In S11, the CRC calculator 32 calculates a CRC value by performing a CRC computation for the transmission data. Then, the CRC inserter 33 appends the CRC value calculated by the CRC calculator 32 to the transmission data. Thus, the topology setup frame 01 is generated.

In S12, the overhead processing unit 16 transmits the generated topology setup frame 01. The CPU 27 activates the timer 29 when the overhead processing unit 16 transmits the topology setup frame 01.

As described above, the particular transmission equipment that operates as a command activation node generates the topology setup frame 01, and transmits the topology setup frame 01 to the next transmission equipment. The topology setup frame goes round a ring network. Namely, transmission equipments on the ring network respectively receive the topology setup frame.

Figure 18:
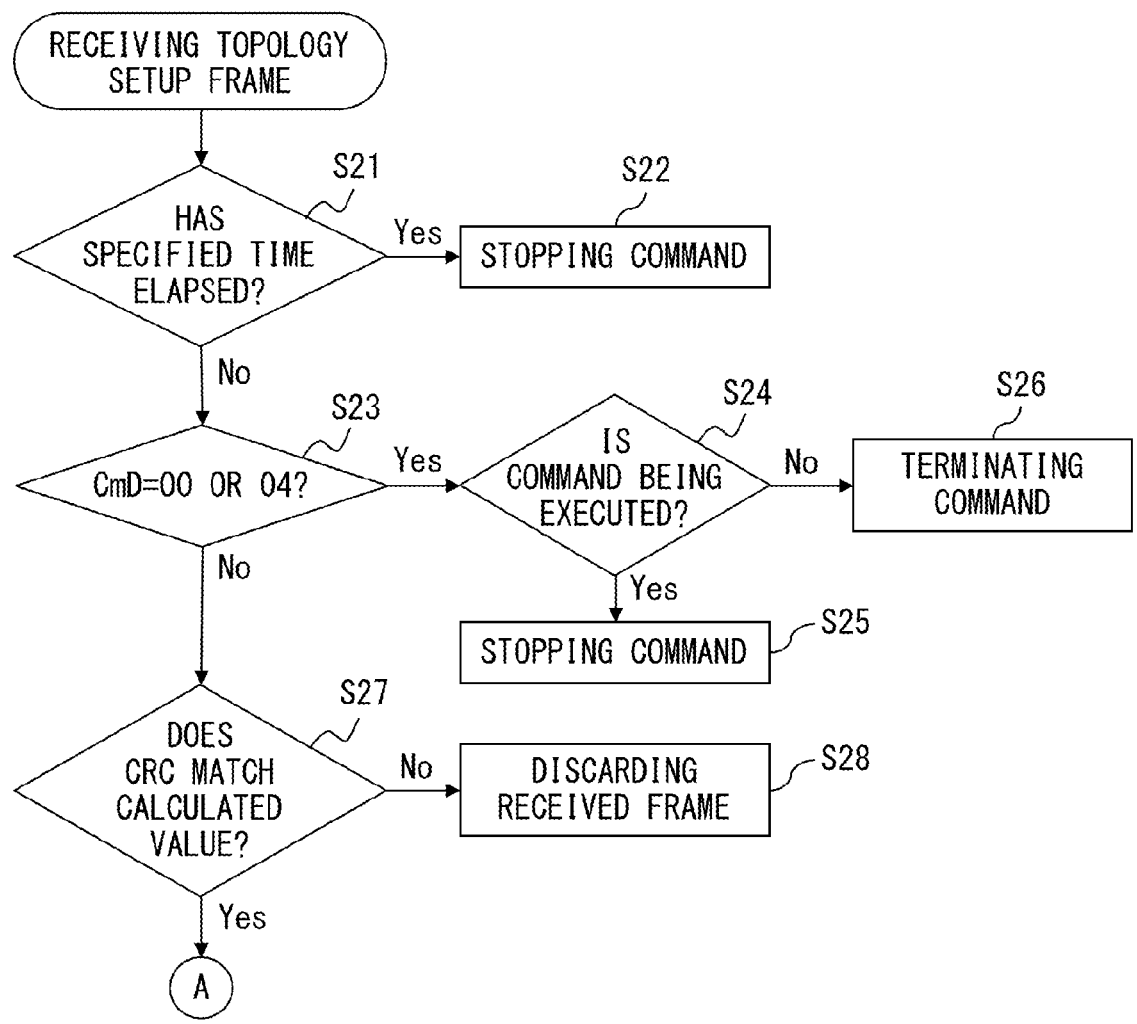
FIGS. 18 to 20 are flowcharts illustrating process of transmission equipment that has received the topology setup frame.
Figure 19:
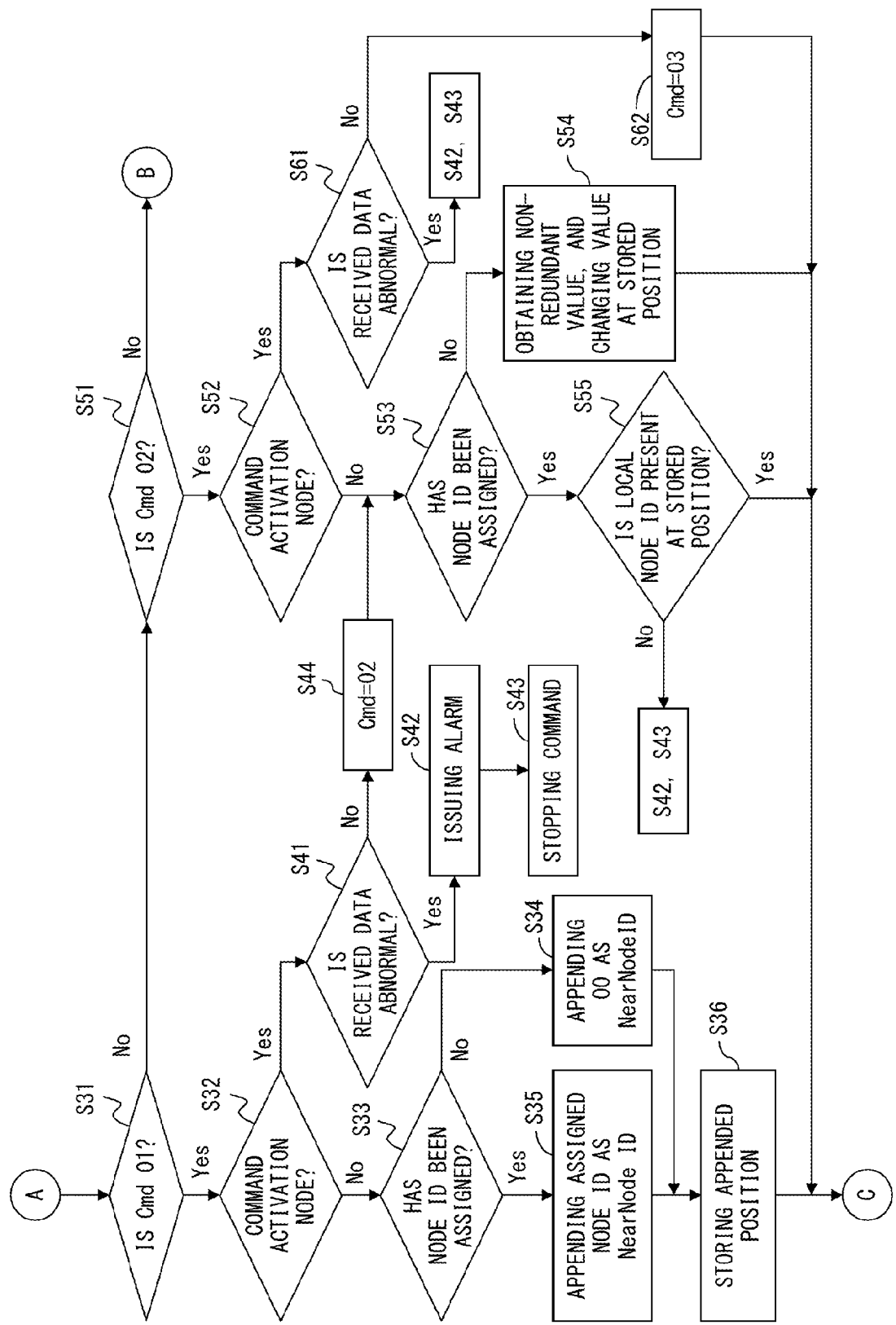
Figure 20:
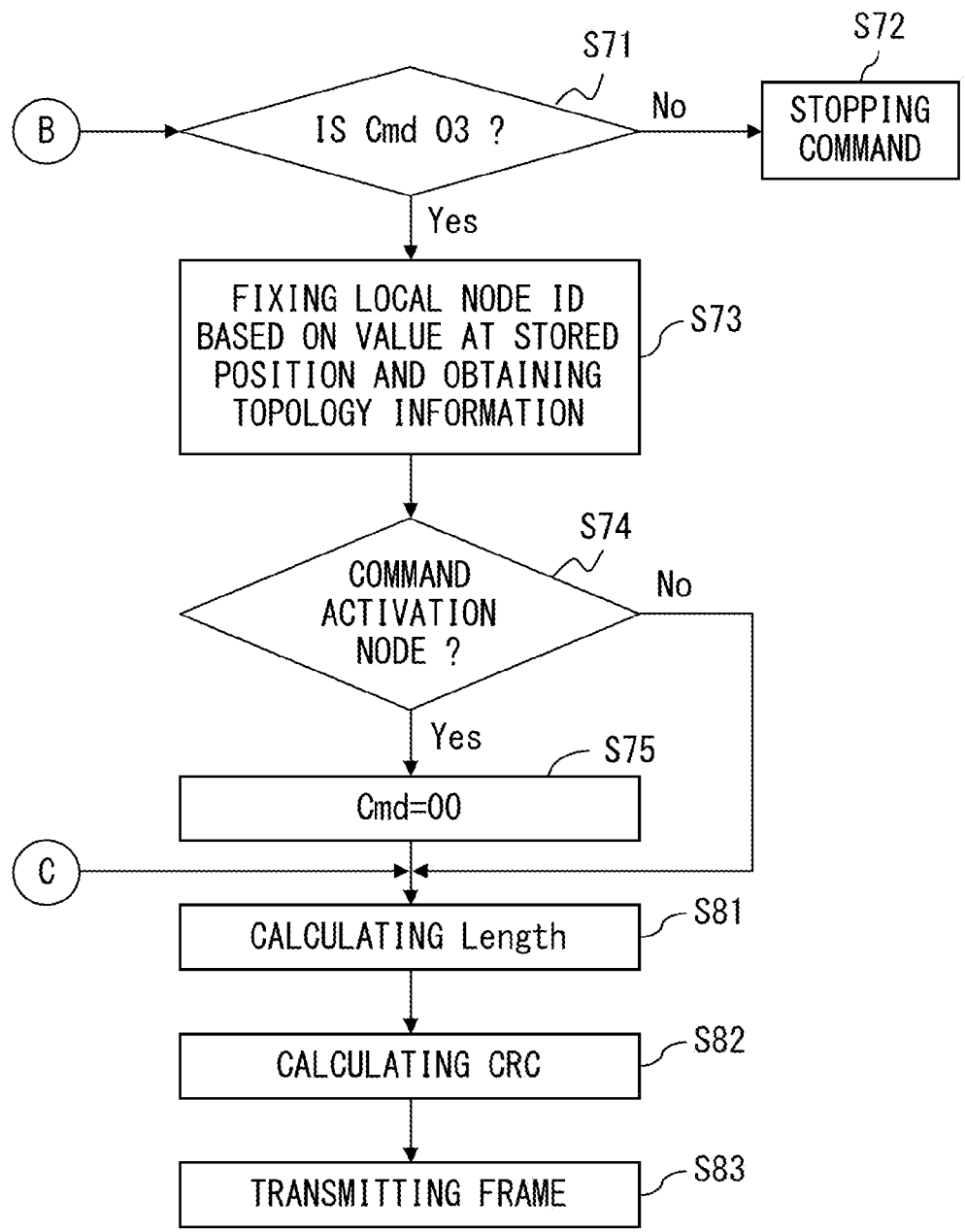

FIGS. 18 to 20 are flowcharts illustrating process of the transmission equipment that has received the topology setup frame. The processes represented by these flowcharts are executed by the overhead processing unit 16 when each of the transmission equipments including the command activation node has received the topology setup frame.

In S21, the CPU 27 checks whether or not specified threshold time period has elapsed from the start of the network setup process. If the specified threshold time period has elapsed, the CPU 27 determines that the network setup process has been unsuccessfully executed. The threshold time period is, but not particularly limited to, for example, approximately 30 seconds.

Here, the command activation node activates the timer 29 when the command activation node transmits the topology setup frame as described above with reference to FIG. 17. The other transmission equipments activate the timer 29 upon receipt of the topology setup frame 01. If the timer 20 exceeds the threshold time period when a new topology setup frame has been received, the CPU 27 determines that the network setup process has been unsuccessfully executed. When the CPU 27 determines that the network setup process has been unsuccessfully executed, the CPU 27 stops the command in S22. At this time, the CPU 27 may set the command identifier Cmd of the topology setup frame to "04: abort command", and may transmit the frame to the next transmission equipment.

If the timer 29 does not exceed the threshold time period, the CPU 27 checks whether the command identifier Cmd of the topology setup frame is either "00" or "04" in S23. When the command identifier Cmd is "00" or "04", the CPU 27 checks whether or not the command transmitted by the topology setup frame is being executed on the ring network in S24.

When the command is being executed, the CPU 27 stops the command in S25. A process of S25 is similar to that of S22. Alternatively, when the command is not being executed, the CPU 27 terminates the command in S26. At this time, the CPU 27 may set the command identifier Cmd of the topology setup frame to "00", and may transmit the frame to the next transmission equipment.

When the command identifier Cmd is neither "00" nor "04", the overhead processing unit 16 makes a comparison between a CRC value set in the topology setup frame and a result of the CRC computation performed for the topology setup frame in S27. When the result of the computation matches the CRC value, the process proceeds to S31. Alternatively, when the result of the computation mismatches the CRC value, the CPU 27 determines that data within the topology setup frame is corrupted. In this case, the CPU 27 discards the received topology setup frame in S28.

In S31, the CPU 27 checks whether or not the command identifier Cmd is "01". When the command identifier Cmd is "01", the process proceeds to S32. When the command identifier Cmd is not "01", the process proceeds to S51.

In S32, the CPU 27 checks whether or not the transmission equipment where the CPU 27 is implemented is a command activation node. At this time, the CPU 27 references the activation node flag stored in the memory 28. If the transmission equipment where the CPU 27 is implemented is not the command activation node, the CPU 27 determines whether or not a node ID has been assigned to the transmission equipment where the CPU 27 is implemented in S33. A process of S33 is substantially the same as S7.

When a node ID has not been assigned yet to the transmission equipment, the CPU 27 writes "00" as NearNodeID in S34. Alternatively, when the node ID has been assigned to the transmission equipment, the CPU 27 writes a node ID stored in the memory 28 as NearNodeID in S35. In S34 or S35, the CPU 27 appends new NearNodeID area to the NearNodeID areas already present in the received topology setup frame. When no NearNodeID area is present in the received topology setup frame, the CPU 27 adds new NearNodeID area next to the MyNodeID area. Then, the CPU 27 writes "00" or "node ID" to the new NearNodeID area.

In S36, the CPU 27 detects a position at which the CPU 27 adds the NearNodeID area to the topology setup frame in S34 or S35. At this time, the CPU 27 stores position information indicating the position of the NearNodeID area in the memory 29.

In S81 and S82, the overhead processing unit 16 generates length data by calculating a data length, and generates CRC data by performing a CRC computation. Thus, a topology setup frame is generated. Then, in S83, the overhead processing unit 16 transmits the topology setup frame to the next transmission equipment. Since the process of S81 to S83 is substantially identical to that of S10 to S12, an explanation of the process is omitted.

If the transmission equipment where the CPU 27 is implemented is the command activation node ("YES" in S32), a process of S41 is executed. S41 is executed by the command activation node when the topology setup frame 01 has returned to the command activation node after going round the ring network.

In S41, the CPU 27 checks whether or not received data stored in the topology setup frame is abnormal. Here, the CPU 27 determines, for example, whether or not the number of elements of the received data exceeds an allowable number. If the received data is abnormal, the CPU 27 issues an alarm and stops the command in S42 and S43.

When the received data is not abnormal ("NO" in S41), the CPU 27 updates the command identifier Cmd of the topology setup frame from "01" to "02" in S44. Thus, the topology setup frame 02 is generated. Hereafter, the process proceeds to S53.

When the command identifier Cmd is not "01" ("NO" in S31), the CPU 27 checks whether or not the command identifier Cmd is "02" in S51. When the command identifier Cmd is "02", the process proceeds to S52. When the command identifier Cmd is not "02", the process proceeds to S71.

In S52, the CPU 27 checks whether or not the transmission equipment where the CPU 27 is implemented is the command activation node. If the transmission equipment where the CPU 27 is implemented is not the command activation node, the CPU 27 determines whether or not a node ID has been assigned to the transmission equipment where the CPU 27 is implemented in S53. Note that S53 is executed not only by the command activation node but by the other transmission equipments. Namely, the command activation node executes S53 when the node newly generates a topology setup frame 02 upon receipt of the topology setup frame 01. The other transmission equipments execute S53 upon receipt of the topology setup frame 02.

If the node ID has not been assigned yet to the transmission equipment ("NO" in S53), the CPU 27 obtains a value different from elements (node IDs or temporary IDs) written in MyNodeID area and NearNodeID areas in S54. Then, the CPU 27 writes the obtained value to the position (corresponding NearNodeID area) indicated by the position information stored in S36. In the command activation node, however, the CPU 27 writes the obtained value to the MyNodeID area.

When the node ID has been already assigned to the transmission equipment ("YES" in S53), the CPU 27 checks whether or not the node ID of the local equipment is written to the position (corresponding NearNodeID area) indicated by the position information stored in S36 in S55. When the node ID of the local equipment is written to the corresponding NearNodeID area, the overhead processing unit 16 executes S81 to S83. Namely, the transmission equipment transmits the topology setup frame 02 to the next transmission equipment without updating the NearNodeID area of the local equipment. Alternatively, when the node ID of the local equipment is not written, the CPU 27 executes S42 and S43. In the command activation node, the CPU 27 checks whether or not the node ID of the local equipment is written to the MyNodeID area in S55.

When the transmission equipment that has received the topology setup frame 02 is the command activation node ("YES" in S52), the CPU 27 checks whether or not the received data stored in the topology setup frame is abnormal in S61. Here, the CPU 27 determines, for example, whether or not elements of the received data are different from each other. If the received data is abnormal, the CPU 27 executes S42 and S43. Note that S61 is executed by the command activation node when the topology setup frame 02 has returned to the command activation node after going round the ring network.

When the received data is not abnormal ("NO" in S61), the CPU 27 updates the command identifier Cmd of the topology setup frame from "02" to "03" in S62. Thus, the topology setup frame 03 is generated. Hereafter, the overhead processing unit 16 executes S81 to S83. Namely, the command activation node transmits the topology setup frame 03.

When the command identifier Cmd is not "02" ("NO" in S51), the CPU 27 checks whether or not the command identifier Cmd is "03" in S71. When the command identifier Cmd is not "03", the CPU 27 stops the command in S72.

When the command identifier Cmd is "03", the CPU 27 obtains a node ID and topology information in S73. Here, in the command activation node, the CPU 27 obtains a node ID from the MyNodeID area, and obtains a data string of elements written in the MyNodeID area and the NearNodeID areas as topology information. In the other transmission equipments, the CPU 27 obtains a node ID from the position (corresponding NearNodeID area) indicated by the position information stored in S36. Moreover, in the other transmission equipments, the CPU 27 generates and obtains topology information by cyclically shifting the above described data string so that the value at the position indicated by the position information is arranged at the start of the data string.

In S74, the CPU 27 checks whether or not the transmission equipment where the CPU 27 is implemented is the command activation node. If the transmission equipment is the command activation node, the CPU 27 generates a topology setup frame including the command identifier Cmd "00", and transmits the generated frame to the next transmission equipment. Alternatively, if the transmission equipment is not the command activation node, the CPU 27 forwards the received topology setup frame to the next transmission equipment without updating the frame.

FIGS. 21 to 24 illustrate a first example of the network setup method. In the first example, six transmission equipments 1a to 1f are connected in the form of a ring. Node IDs are not assigned to the transmission equipments. Here, assume that the transmission equipment 1a operates as particular transmission equipment (namely, a command activation node).

The transmission equipment 1a generates a topology setup frame 01, and transmits the generated frame to the transmission equipment 1b as illustrated in FIG. 21. At this time, the transmission equipment 1a generates the topology setup frame 01 according to the flowchart illustrated in FIG. 17. Namely, the transmission equipment 1a sets "01" as a command Cmd identifier in S2, sets Version data in S3, sets "00" as Eslot data in S6, and sets "00" as MyNodeID in S8. The transmission equipment 1a sets a MAC address of the transmission equipment 1a as unique data.

Upon receipt of the topology setup frame 01, each of the transmission equipments 1b to 1f writes "00" to a corresponding NearNodeID area in S34. At this time, the transmission equipments 1b to 1f write "00" to NearNode1 to NearNode5 areas, respectively. Moreover, each of the transmission equipments 1b to 1f stores position information indicating a position of the area, to which the transmission equipment writes the data. Then, the transmission equipment 1f transmits the topology setup frame 01 to the transmission equipment 1a.

Upon receipt of the topology setup frame 01 from the transmission equipment 1f, the transmission equipment 1a checks whether or not received data is abnormal in S41. Here, the number of elements stored in the data area (MyNodeID area and NearNodeID area) of the topology setup frame 01 is "6", which is smaller than an allowable number. Therefore, the transmission equipment 1a determines that the received data is not abnormal. Then, the transmission equipment 1a generates a topology setup frame 02 as illustrated in FIG. 22. Namely, the transmission equipment 1a updates the command identifier Cmd from "01" to "02" in S44. Moreover, the transmission equipment 1a writes the temporary node ID "01" to a MyNodeID area in S54. Then, the transmission equipment 1a transmits the topology setup frame 02 to the transmission equipment 1b.

Upon receipt of the topology setup frame 02, each of the transmission equipments 1b to 1f writes a temporary node ID to the NearNodeID area of the local equipment in S54. Namely, the transmission equipments 1b to 1f update the NearNode1 area to the NearNode5 area to "02" to "06", respectively. Then, the transmission equipment 1f transmits the topology setup frame 02 to the transmission equipment 1a.

Upon receipt of the topology setup frame 02 from the transmission equipment 1f, the transmission equipment 1a checks whether or not the received data is abnormal in S61. Here, since the elements stored in the data area of the topology setup frame 02 are different from each other, the transmission equipment 1a determines that the received data is not abnormal. Then, the transmission equipment 1a generates a topology setup frame 03 as illustrated in FIG. 23. Namely, the transmission equipment 1a updates the command identifier Cmd from "02" to "03 in S44. Then, the transmission equipment 1a transmits the topology setup frame 03 to the transmission equipment 1b.

Upon receipt of the topology setup frame 03, each of the transmission equipments 1b to 1f obtains corresponding node ID and topology information in S73. Then, the transmission equipment 1f transmits the topology setup frame 03 to the transmission equipment 1a.

Upon receipt of the topology setup frame 03 from the transmission equipment 1f, the transmission equipment 1a obtains corresponding node ID and topology information in S73. Moreover, the transmission equipment 1a generates an end command including a command identifier Cmd "00" as illustrated in FIG. 24. Namely, the transmission equipment 1a generates the end command in S75. Then, the transmission equipment 1a transmits a frame including the end command to the transmission equipment 1b. Upon receipt of the end command, each of the transmission equipments 1b to 1f terminates the setup process in S26.

FIG. 25 illustrates a second example of the network setup method. In the second example, node IDs "08", "09", "06", "05", "01", and "07" are respectively assigned in advance to the transmission equipments 1a to 1f.

The transmission equipment 1a, which is the command activation node, writes the node ID "08" assigned to the transmission equipment 1a to MyNodeID area of the topology setup frame 01 in S9. Then, the transmission equipment 1a transmits this topology setup frame 01 to the transmission equipment 1b.

Upon receipt of the topology setup frame 01, each of the transmission equipments 1b to 1f writes a node ID assigned to the local equipment to corresponding NearNodeID area in S35. For example, the transmission equipment 1b writes "09" to the NearNode1 area, and the transmission equipment 1f writes "07" to the NearNode5 area. Then, the transmission equipment 1f transmits the topology setup frame 01 to the transmission equipment 1a.

Subsequent processes in the second example are substantially identical to those of the first example illustrated in FIGS. 22 to 24. In the second example, however, the node IDs are assigned in advance to the transmission equipments 1a to 1f. Therefore, each of the transmission equipments 1a to 1f transfers the topology setup frame 02 to the next transmission equipment without executing S54.

Figure 26:
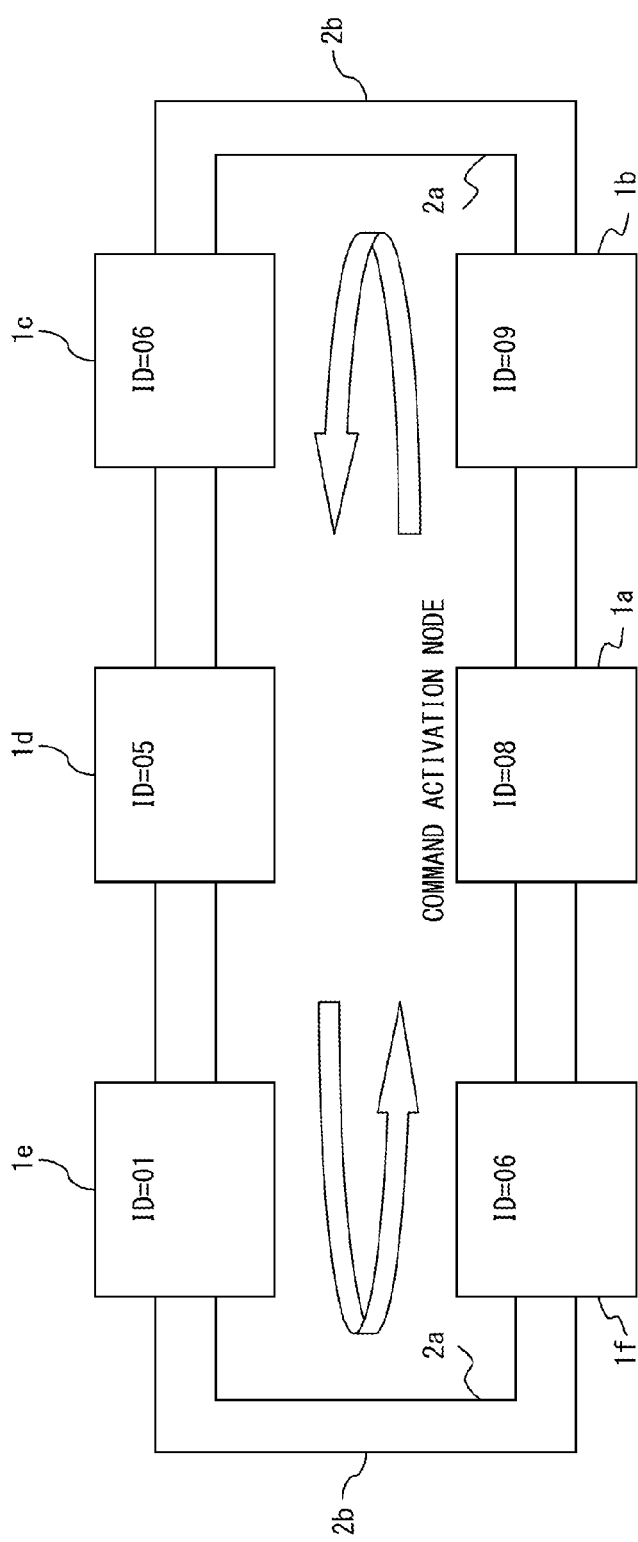
FIG. 26 illustrates a third example of the network setup method.

FIG. 26 illustrates a third example of the network setup method. In the third example, node IDs "08", "09", "06", "05", "01", and "06" are respectively assigned in advance to the transmission equipments 1a to 1f. Namely, the same node ID is redundantly assigned to the transmission equipments 1c and 1f.

An operation that each of the transmission equipments 1a to 1f performs to write corresponding node ID to the topology setup frame 01 in the third example is substantially identical to that of the second example illustrated in FIG. 25. Then, the transmission equipment 1f transmits the topology setup frame 01 to the transmission equipment 1a.

Upon receipt of the topology setup frame 01 illustrated in FIG. 26 from the transmission equipment 1f, the transmission equipment 1a checks whether or not received data is abnormal in S41 or S61. In this example, the number of elements stored in the data area (MyNodeID area and NearNodeID areas) of the topology setup frame 01 is "6", which is smaller than the allowable number. However, some of the elements within the data area of the topology setup frame 01 are redundant. Specifically, NearNode2 and NearNode6 have the same value. Accordingly, the transmission equipment 1a issues an alarm in S42.

FIG. 27 illustrates a fourth example of the network setup method. In the fourth example, a fault occurs between the transmission equipments 1e and 1f when the topology setup frame 03 transmitted from the transmission equipment 1a is going round the ring network as illustrated in FIG. 27.

The transmission equipment 1a, which is the command activation node, activates the timer 29 when the transmission equipment 1a transmits the topology setup frame, and resets the timer 29 when the topology setup frame is returned to the transmission equipment 1a after going round the ring network. Accordingly, in FIG. 27, the transmission equipment 1a activates the timer 29 when the transmission equipment 1a transmits the topology setup frame 03.

As described above with reference to FIG. 23, each of the transmission equipments obtains corresponding node ID and topology information from the topology setup frame 03. In FIG. 27, each of the transmission equipments 1b to 1f obtains corresponding node ID and topology information.

However, since the fault occurs between the transmission equipments 1e and 1f, the transmission equipment 1a does not receive the topology setup frame 03 within a specified time period. Therefore, the timer 29 expires in the transmission equipment 1a. Here, an expiration time of the timer 29 is, for example, approximately 30 seconds. When the timer 29 has expired, the transmission equipment 1a generates a frame including an abort command, and transmits the frame to the transmission equipment 1b so that the abort command goes around the ring network. The abort command is identified by a command identifier Cmd "04" as illustrated in FIG. 27.

Upon receipt of the abort command, each of the transmission equipments discards the node ID and the topology information, which have been obtained from the topology setup frame 03. In the example illustrated in FIG. 27, each of the transmission equipments 1b to 1e discards the node ID and the topology information in response to the abort command. As described above, when topology information is set only for some of transmission equipments, a command activation node instructs the transmission equipments to discard the topology information.

Figure 28:
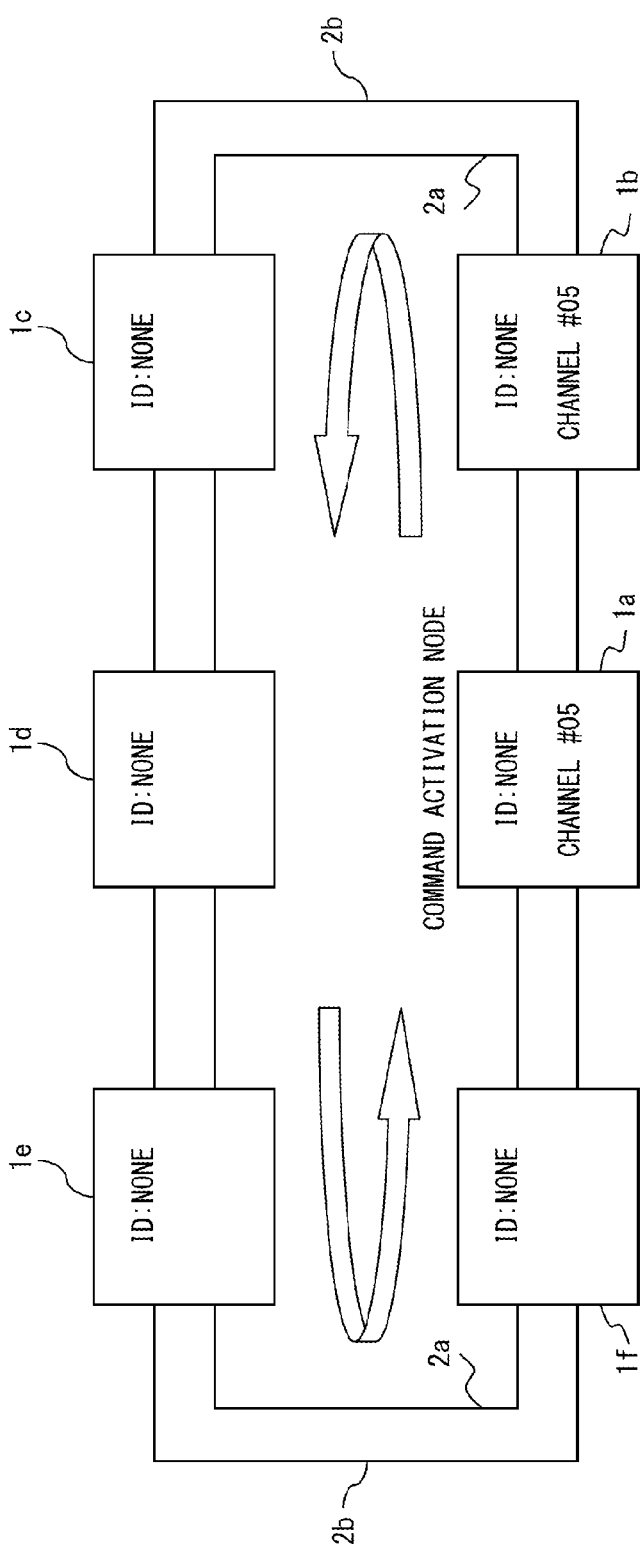
FIG. 28 illustrates a fifth example of the network setup method.

FIG. 28 illustrates a fifth example of the network setup method. In the fifth example, a bandwidth between the transmission equipments 1a and 1b is 100 Gbit/s, and that of the other transmission sections is 10 Gbit/s.

Operations of the transmission equipments 1a to 1f in the fifth example are substantially identical to those of the first example. In the fifth example, however, the transmission equipment 1a sets Eslot data in order to designate a channel between the transmission equipments 1a and 1b. In FIG. 28, the transmission equipments 1a and 1b use channel #5 in a transmission line between the transmission equipments 1a and 1b in order to transmit an optical signal of a ring network that connects the transmission equipments 1a to 1f. In this case, the transmission equipment 1a writes the Eslot data "05" to the topology setup frame 01.

Upon receipt of the topology setup frame 01, the transmission equipment 1b updates the Eslot data from "05" to "00". Hereafter, the Eslot data is left unchanged as "00" without being updated until the topology setup frame 01 reaches the transmission equipment 1a. Eslot data is set to "05" also in the topology setup frames 02 and 03 between the transmission equipments 1a and 1b. By using the Eslot data as described above, a transparent communication can be implemented even if a section having a different bandwidth coexists on a ring network.

Figure 29:
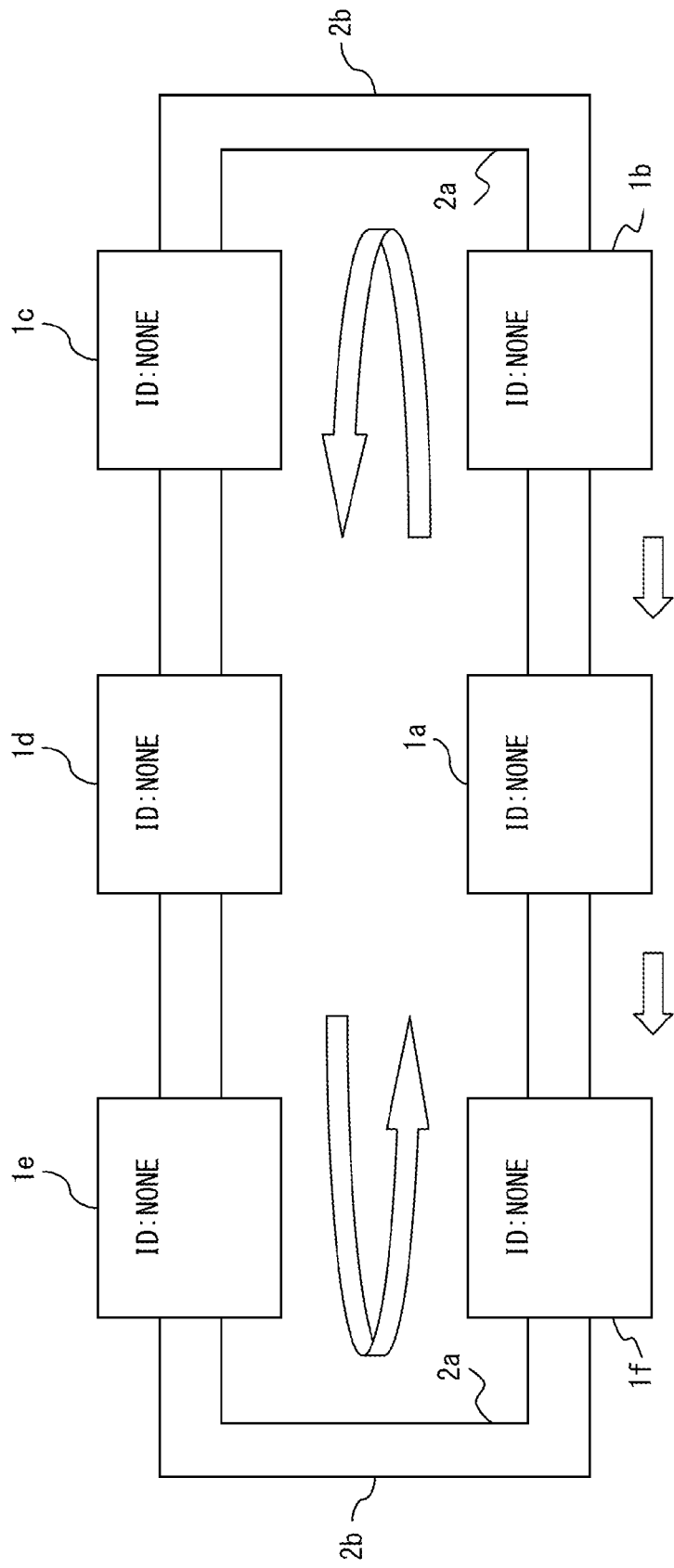
FIG. 29 illustrates a sixth example of the network setup method.

FIG. 29 illustrates a sixth example of the network setup method. In the sixth example, a topology setup frame is transmitted in a direction reverse to that in the first to the fifth examples. Each of the transmission equipments can store information indicating a direction where a topology setup frame goes round although this is not referred to in the first to the fifth examples. Each of the transmission equipments obtains topology information from a node ID string in a data area of the topology setup frame in consideration of the direction where the topology setup frame goes round.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network setup method used in a ring network including a plurality of transmission equipments, the method comprising:
   transmitting a frame in the ring network;
   causing each of the transmission equipments to determine a temporary identifier and to write the temporary identifier to the frame according to a specified rule;
   determining whether or not a plurality of temporary identifiers written to the frame by the plurality of transmission equipments satisfy a specified condition; and
   causing each of the transmission equipments to obtain a corresponding temporary identifier as a qualified identifier according to the specified rule from among the plurality of temporary identifiers, when the plurality of temporary identifiers satisfy the specified condition.

2. The network setup method according to claim 1, further comprising
   generating topology information that represents a topology of the ring network based on an order where the plurality of temporary identifiers are written to the frame.

3. A network setup method used in a ring network including a plurality of transmission equipments, the method comprising:
   transmitting a frame in the ring network;
   causing each of the transmission equipments to write an identifier to the frame according to a specified rule;
   determining whether or not a plurality of identifiers written to the frame by the plurality of transmission equipments satisfy a specified condition; and
   causing each of the transmission equipments to obtain a corresponding identifier according to the specified rule from among the plurality of identifiers, when the plurality of identifiers satisfy the specified condition, wherein
   it is determined that the specified condition is satisfied when the plurality of identifiers written to the frame are different from each other.

4. A network setup method used in a ring network including a plurality of transmission equipments, the method comprising:
   transmitting a frame in the ring network;
   causing each of the transmission equipments to write an identifier to the frame according to a specified rule;
   determining whether or not a plurality of identifiers written to the frame by the plurality of transmission equipments satisfy a specified condition; and
   causing each of the transmission equipments to obtain a corresponding identifier according to the specified rule from among the plurality of identifiers, when the plurality of identifiers satisfy the specified condition, wherein
   it is determined that the specified condition is satisfied when the number of the plurality of identifiers written to the frame is equal to or smaller than a specified allowable number.

5. The network setup method according to claim 1, wherein each of the transmission equipments writes, to the frame, a corresponding identifier other than the temporary identifiers that have been written to the frame upon receipt of the frame.

6. The network setup method according to claim 5, wherein transmission equipment to which a qualified identifier is assigned in advance writes the preassigned qualified identifier to the frame.

7. The network setup method according to claim 1, wherein each of the transmission equipments writes a temporary identifier of local equipment to an area next to an area to which immediately preceding transmission equipment has written a temporary identifier.

8. A network setup method used in a ring network including a plurality of transmission equipments, wherein
particular transmission equipment selected from among the plurality of transmission equipments transmits a first frame including a first command so that the first frame goes round the ring network;
each of the transmission equipments writes, to the first frame, presence information representing that the transmission equipment is present in response to the first command;
the particular transmission equipment transmits a second frame including a second command so that the second frame goes round the ring network, when the number of transmission equipments detected based on the presence information written to the first frame is equal to or smaller than a specified allowable number;
each of the transmission equipments writes an identifier to the second frame according to a specified rule in response to the second command;
the particular transmission equipment transmits a third frame including a third command and the plurality of identifiers so that the third frame goes round the ring network, when the plurality of identifiers written to the second frame are different from each other; and
each of the transmission equipments obtains a corresponding identifier according to the specified rule from among the plurality of identifiers included in the third frame in response to the third command.

9. Transmission equipment used in a ring network including a plurality of transmission equipments, the transmission equipment comprising:
a first transmitter configured to transmit a frame including a command for instructing each of the transmission equipments to write a temporary identifier according to a specified rule;
a decision unit configured to determine whether or not a plurality of temporary identifiers written by the plurality of transmission equipments to the frame satisfy a specified condition; and
a second transmitter configured to transmit a frame including the plurality of temporary identifiers and a command for instructing each of the transmission equipments to obtain a corresponding temporary identifier as a qualified identifier from among the plurality of temporary identifiers according to the specified rule, when the plurality of temporary identifiers satisfy the specified condition.

10. Transmission equipment used in a ring network including a plurality of transmission equipments, the transmission equipment comprising:
a writer configured to write a temporary identifier to a first frame, which goes round the ring network, according to a specified rule; and
an obtaining unit configured to obtain a corresponding temporary identifier as a qualified identifier according to the specified rule from a second frame including a plurality of temporary identifiers written by the plurality of transmission equipments, the second frame being generated from the first frame when the plurality of temporary identifiers satisfy a specified condition.

* * * * *